United States Patent
Wiesner et al.

(10) Patent No.: US 11,724,232 B2
(45) Date of Patent: Aug. 15, 2023

(54) POROUS RESIN STRUCTURES

(71) Applicant: Cornell University, Ithaca, NY (US)

(72) Inventors: Ulrich B. Wiesner, Ithaca, NY (US);
Michael O. Thompson, Ithaca, NY (US); Kwan Wee Tan, Singapore (SG);
Byungki Jung, Portland, OR (US)

(73) Assignee: CORNELL UNIVERSITY, Ithaca, NY (US)

( * ) Notice: Subject to any disclaimer, the term of this patent is extended or adjusted under 35 U.S.C. 154(b) by 55 days.

(21) Appl. No.: 15/364,779

(22) Filed: Nov. 30, 2016

(65) Prior Publication Data

US 2017/0151584 A1    Jun. 1, 2017

Related U.S. Application Data

(60) Provisional application No. 62/260,889, filed on Nov. 30, 2015.

(51) Int. Cl.
*B01D 67/00* (2006.01)
*B01D 71/80* (2006.01)
(Continued)

(52) U.S. Cl.
CPC ....... *B01D 67/003* (2013.01); *B01D 67/0032* (2013.01); *B01D 69/02* (2013.01); *B01D 71/80* (2013.01); *C08J 9/00* (2013.01); *B01D 67/0034* (2013.01); *B01D 71/28* (2013.01); *B01D 71/52* (2013.01); *B01D 71/70* (2013.01); *B01D 2325/022* (2013.01); *B01L 3/502707* (2013.01)

(58) Field of Classification Search
None
See application file for complete search history.

(56) References Cited

U.S. PATENT DOCUMENTS

2010/0147798 A1* 6/2010 Lin ................. H01L 31/02363
    216/49
2012/0234695 A1* 9/2012 Mayes ................ C01B 32/20
    205/758

(Continued)

FOREIGN PATENT DOCUMENTS

CN      104148042 A  * 11/2014
WO   WO-2014056478 A2  *  4/2014

OTHER PUBLICATIONS

Thurn-Albrecht (Adv. Mater. 2000, 12, No. 11, pp. 787-791) (Year: 2000).*

(Continued)

*Primary Examiner* — Joel G Horning
(74) *Attorney, Agent, or Firm* — Paul J. Roman, Jr.; Johnson, Marcou, Isaacs & Nix, LLC

(57) ABSTRACT

A method providing direct access to porous three-dimensionally (3D) continuous polymer network structures and shapes by combining BCP-resol co-assembly with $CO_2$ laser-induced transient heating. The $CO_2$ laser source transiently heats the BCP-directed resol hybrid films to high temperatures at the beam position, inducing locally controlled resol thermopolymerization and BCP decomposition in ambient conditions. This enables shaping of BCP-directed porous resin structures with tunable 3D interconnected pores in a single process. Pore size can be varied from 10 nm to about 600 nm.

18 Claims, 13 Drawing Sheets

(51) Int. Cl.
*B01D 69/02* (2006.01)
*C08J 9/00* (2006.01)
B01D 71/70 (2006.01)
B01D 71/52 (2006.01)
B01L 3/00 (2006.01)
B01D 71/28 (2006.01)

(56) References Cited

U.S. PATENT DOCUMENTS

2013/0029103 A1* 1/2013 Landry-Coltrain ....... B41C 1/05
  428/159
2016/0001396 A1* 1/2016 Brandl .................... A61L 27/10
  264/400

OTHER PUBLICATIONS

Shen (Scientific Reports 3, Article No. 2294 (2013) (Year: 2013).*

* cited by examiner

POROUS RESIN STRUCTURES

CROSS REFERENCE TO RELATED APPLICATIONS

This application claims priority to U.S. Provisional Application No. 62/260,889, filed on Nov. 30, 2015, the disclosure of which is hereby incorporated by reference.

STATEMENT REGARDING FEDERALLY SPONSORED RESEARCH

This invention was made with government support under contract no. 1409105 awarded by the National Science Foundation. The government has certain rights in the invention.

FIELD OF THE DISCLOSURE

The disclosure generally relates to formation of porous structures. More particularly the disclosure relates to formation of porous structures using an organic material that has both a positive tone component and a negative tone component.

BACKGROUND OF THE DISCLOSURE

Well-ordered mesoporous materials derived from small-molecule surfactant and block copolymer (BCP) self-assembly have been explored extensively over the past two decades in the form of amorphous, polycrystalline and single-crystal solids. Multiple time-consuming processing steps are often required to generate the final structures. For example, the removal of organic components by conventional thermal processing to create the desired porosity typically takes several hours. Several methods to fabricate hierarchical porous polymer scaffolds using BCPs have recently been devised that circumvent some of the complexities of previous approaches, but they still involve multiple steps and control over macroscopic shape using these methods is limited.

Laser-induced transient heating of organic materials has been explored as an alternative thermal processing approach to alter morphology as well as materials properties and to enable direct pattern transfer. However, severe film degradation and extensive damage was observed for $CO_2$ laser heating on >10 ms. Also line-edge roughness increased as line spacing widths decreased.

Well-ordered nanoporous materials derived from small-molecule surfactant and BCP self-assembly have been explored in the form of amorphous, polycrystalline and single-crystal solids. Multiple time-consuming processing steps are typically required to generate the final structures. For example, removal of organic components by conventional thermal processing to create porosity typically takes several hours. Further developments are still desirable, as hierarchical structures provide high surface area combined with high flux beneficial for a number of applications.

Laser-induced transient heating of organic materials has been explored as an alternative thermal processing approach to alter morphology, as well as materials properties and to enable direct pattern transfer. For example, by laser heating in the millisecond to sub-millisecond timeframes the temperature stability of a methacrylate-based photoresist was enhanced by ~400° C. relative to conventional hotplate heating. $CO_2$ laser ablation of polyimide and polyetherimide resulted in the direct formation of three-dimensional (3D) porous graphitic carbon network structures, but work did not involve a bottom up self-assembly process resulting in little control over mesostructure and pore size.

Three-dimensional porous structure fabrication by optical lithography has also been demonstrated using multiphoton absorption polymerization (MAP) and stimulated emission depletion (STED) inspired direct laser writing techniques. However, direct laser writing of such 3D continuous structures with sub-100-nm feature size and periodicity remains challenging due to the inherent serial mode of operation and sophisticated instrumentation, diffraction limitations of MAP excitation lasers, and stringent materials criteria—e.g., for STED resists.

SUMMARY OF THE DISCLOSURE

Disclosed here in is a rapid, single-step process that provides control over mesoscopic pore structure and macroscopic material shape by combining block co-polymer (BCP)-resol co-assembly with $CO_2$ laser-induced transient heating and the material therein.

The $CO_2$ laser source transiently heats the BCP-directed resol hybrid films to high temperatures at the beam position, inducing locally controlled resol thermopolymerization and BCP decomposition in ambient conditions. This enables shaping of BCP-directed porous resin structures with tunable 3D interconnected pores in a single process. Pore size can be varied from 10 nm to about 600 nm. Together with the chemical, mechanical and thermal properties of the hierarchical porous resin structures, the method can enable further adaptation to a number of applications, including microfluidics, sensing and energy storage.

This direct laser writing method works for and can be applied on hybrid thin films consisting of multi-block amphiphilic block copolymer of various makeups (AB, ABA, ABC, ABCD, etc., where each letter represents a different block component) that contains both hydrophobic and hydrophilic blocks, with the resol additives attracted to the hydrophilic block for directed-structure formation.

The all-organic hybrid thin film has a continuous structure that is mechanically and thermally stable after removal of the block polymer by laser heating.

The present materials can be used in a wide variety of applications including catalysis, energy conversion and storage, and membrane filtration.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
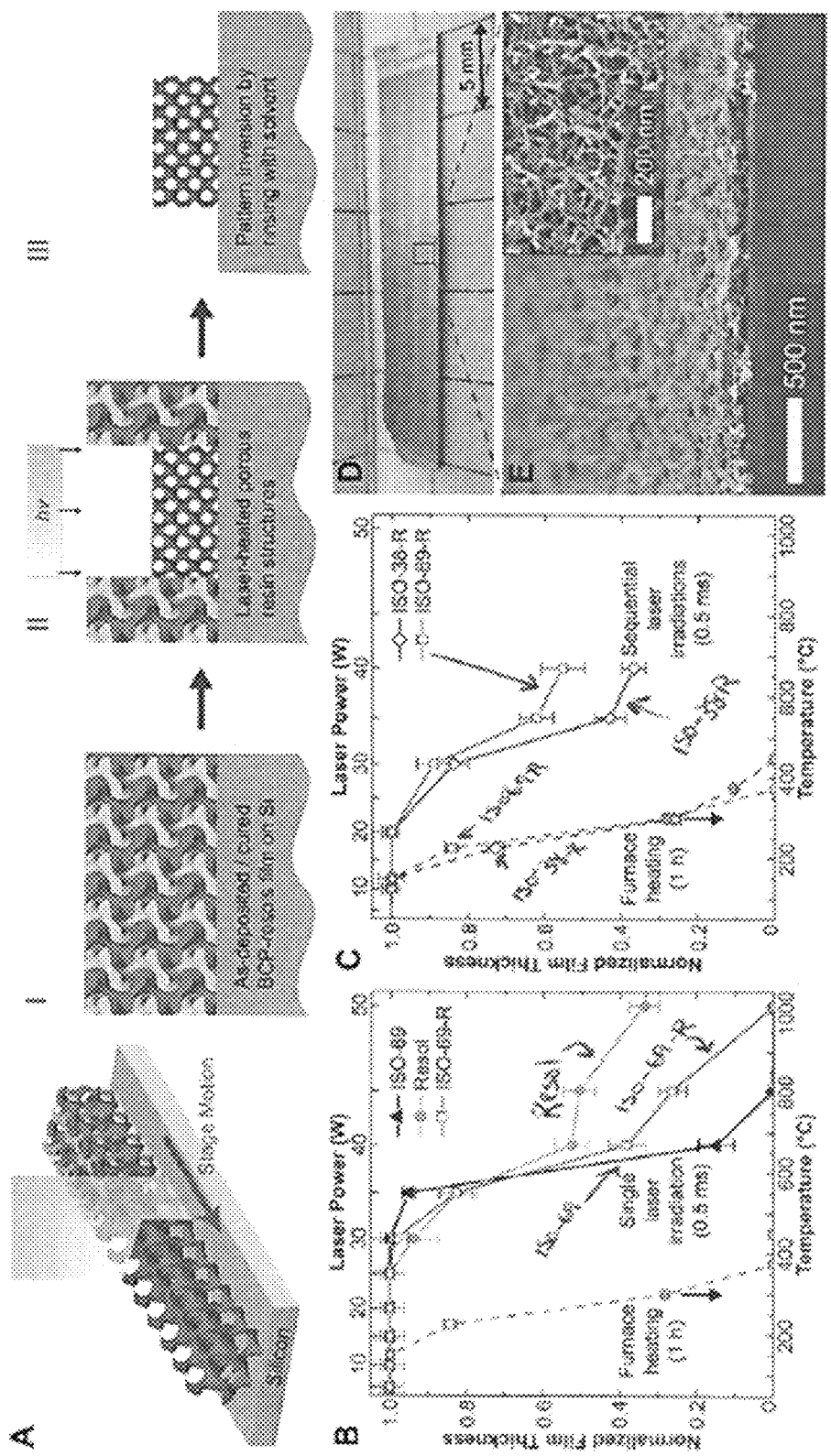
FIG. 1. Transient laser heating of BCP-directed resols hybrid samples. (A) Schematic of the B-WRITE method. (B) Thickness plots of 5 wt % ISO-69, 5 wt % resols, and 6 wt % ISO-69-R hybrid thin films heated by a single $CO_2$ laser irradiation of 0.5-ms dwell (solid lines) compared with furnace heating for 1 hour (dashed line), all in air. (C) Thickness plots of 6 wt % ISO-38/69-R hybrid thin films heated by sequential $CO_2$ laser irradiations of 0.5-ms dwell (solid lines) compared with furnace heating for 1 hour (dashed lines), all in air. (D and E) Optical image of macroscopic trenches in sample ISO-38-R after sequential $CO_2$ laser irradiations (D) with corresponding SEM cross-section and plan view (inset) of the resulting structures in a trench (E). Each B-WRITE trench was generated in less than 5 minutes.

Although claimed subject matter will be described in terms of certain embodiments, other embodiments, including embodiments that do not provide all of the benefits and features set forth herein, are also within the scope of this disclosure. Various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides hierarchically porous structures and methods of making same. The hierarchically porous structures can be used in various applications such as, for example, devices (e.g., microfluidic devices). The term "hierarchical" as used herein, such as in conjunction with structures, in intended to mean materials containing multiple length scale structural and/or architectural features, whose size (at least one dimension) ranges from the macroscopic (e.g. centimeter) to the nanoscopic (e.g., nanometer) scale.

Development of rapid processes combining hierarchical self-assembly with mesoscopic shape control has remained a challenge. This is particularly true for high surface area porous materials essential for applications including separation and detection, catalysis, and energy conversion and storage. We describe a simple and rapid laser writing method compatible with semiconductor processing technology to control three-dimensionally continuous hierarchically porous polymer network structures and shapes. Combining self-assembly of mixtures of, for example, block copolymers and resols with spatially localized transient laser heating enables pore size and pore size distribution control in all-organic and highly conducting inorganic carbon films with variable thickness. The method provides, for example, all-laser-controlled pathways to complex high surface area structures including fabrication of microfluidic devices with high surface area channels and complex porous crystalline semiconductor nanostructures.

In an aspect, the present method provides methods of making hierarchically porous structures. The methods are based on forming pores by the thermal degradation of a polymer material (e.g., the thermal degradation of one or more domains of a polymer material such as, for example, domains formed by self-assembly of a block copolymer). The methods are referred to herein as B-WRITE methods.

For example, a method of making a hierarchically porous structure comprising: a) forming a layer comprising a positive tone material and a negative tone material (e.g., an all organic hybrid thin film) on at least a portion of a surface of a substrate, where the positive tone material self assembles providing hierarchically structured domains, and b) exposing at least a portion of the layer to electromagnetic radiation, where at least a portion of the positive tone material in the portion of the layer contacted with the electromagnetic radiation thermally decomposes and the hierarchically porous structure is formed. A laser beam may contact the portion of the layer that is exposed to the electromagnetic radiation. In an instance, only the portion of the layer is exposed to the electromagnetic radiation.

In various examples, a method further comprises repeated exposing of the layer of positive tone material and negative tone material to electromagnetic radiation (e.g., repeating b) in the method above a desired number of times). The repeating can be carried out with the same electromagnetic radiation (e.g., wavelength and/or flux) or independently selected electromagnetic radiation (e.g., independently selected wavelength and/or flux). By repeatedly exposure of the layer of positive tone material and negative tone material to electromagnetic radiation, the same hierarchically porous structures or selected hierarchically porous structures can be formed.

In various examples, a method further comprises one or more processes carried out after the layer is exposed to electromagnetic radiation. For example, a method further comprises thermal treatment of the hierarchically porous structures to form carbonized (e.g., graphitized or partially graphitized) hierarchically porous structures.

The layer comprises a positive tone material and a negative tone material. The positive tone material (or a portion of the positive tone material) is thermally decomposed and is removed from the film in the portion(s) of the film exposed to electromagnetic radiation. The negative tone material is thermally polymerized in the portion(s) of the film exposed to electromagnetic radiation.

Positive tone materials (also referred to herein as first polymeric materials) self-assemble in the layer providing domains that can be thermally decomposed. The domains can have various morphologies. Positive tone materials can be organic materials that are typically thermally degradable under conventional heating (e.g., above 500 degree Celsius) and millisecond laser heating (e.g., 800 degree Celsius and above for 500 millisecond heating dwell). Examples include, but are not limited to, homopolymers, multiblock copolymers, surfactants and DNA molecules. Examples of homopolymers include, but are not limited to Polyisoprene, Polystyrene, Polyethylene oxide, Polypropylene oxide, Polyvinylpyridine, Polybutadiene, Polyethylene, Polypropylene, Polyvinyl chloride, Polymethyl methacrylate. Examples of block copolymers include, but are not limited to Polyisoprene-block-polyethylene oxide, Polyethylene oxide-block-polypropylene oxide-block-polyethylene oxide, polystyrene-block-polyethylene oxide, polystyrene-block-polymethyl methacrylate, polystyrene-block-polyvinylpyridine, polyisoprene-block-polystyrene-polyvinylpyridine.

Examples of positive tone materials include, but are not limited to, block copolymers. Examples of block copolymers include AB, ABA, ABC, and ABCD block copolymers etc. (where each letter represents a different block component). The block copolymers comprise both hydrophobic and hydrophilic blocks. Examples of block copolymers include, but are not limited to, ABC triblock terpolymers such as, for example, [poly(isoprene)-block-poly(styrene)-block-poly(ethylene oxide), ISO-38/69] and ABA di-BCPs, such as, for example, Pluronic F127. Positive tone materials can be synthesized by methods known in the art and are commercially available.

The positive tone materials can self-assemble to provide domains having various sizes, morphologies, and distributions of domains.

For example, the positive tone materials form mesostructures that are inverse micellar and hexagonally packed cylinders. In another example, the positive tone material form ordered, bicontinuous networks, such as gyroidal mesoporous structures. In another example, the ordered gyroidal structure is an alternating gyroid morphology (also referred to as an ordered alternating gyroidal structure). In another example, the positive tone materials form a gyroidal structure. For example, a double gyroidal morphology is obtainable with a hybrid composite of ISO and resols in which the PEO-resols phase comprises 60-75 vol % of the hybrid composite. The alternating gyroidal morphology of which one can achieve the single gyroidal mesoporous carbon can be obtained with a hybrid composite of ISO and resols with a composition of about 20-30 vol % PI, 40-60 vol % PS, and 10-30 vol % PEO-resols phase. The volume percentages are calculated using the densities of the homopolymers of 0.83 g/cm$^3$ for PI, 0.969 g/cm$^3$ for PS, 1.06 g/cm$^3$ for PEO, and 1.1 g/cm$^3$ for resols.

Examples of negative tone materials (also referred to herein as second polymeric materials) include, but are not limited to, polymeric materials such as, for example, resols. Examples of resols include, but are not limited to, phenolic resins, phenol-formaldehyde resins and resorcinol-formaldehyde resins and combinations thereof. Other examples include thermopolymerizable organic oligomers (such as phenol-formaldehye resols, furfuryl alcohol), sol-gel based inorganic nanoparticles and ligand-stabilized inorganic nanoparticles (metal, semiconductor, ceramics), polymers containing an inorganic component (e.g. polystyrene-block-polydimethylsiloxane). Negative tone materials can be synthesized by methods known in the art and are commercially available.

Various ratios of positive tone material(s) to negative tone material(s) can be used. For example, pore size and/or pore size distribution in the product layer comprising hierarchically porous structures can be selected by use of appropriate ratios of positive tone material(s) to negative tone material(s).

The layer can be formed by coating methods known in the art. For example, the layer is formed by spin-coating.

The layer can be thermally cured prior to contacting the layer with electromagnetic radiation. Thermal curing methods are known in the art.

The thermal degradation of the polymer material can be caused by various means. The thermal degradation can be carried out across all of the layer or in selected portions of the film. Without intending to be bound by any particular theory, it is considered that the electromagnetic radiation provides transient heating in the portion of film exposed to the electromagnetic radiation. For example, the electromagnetic radiation is provided by a laser. In an example, a carbon dioxide ($CO_2$) laser (e.g., a carbon dioxide ($CO_2$) laser having a principal wavelength of 10.6 micrometer) is used. In an example, the selective thermal degradation is carried out by rastering a laser beam across the layer. For example, pore size and/or pore size distribution in the product layer comprising hierarchically porous structures can be selected by use of appropriate electromagnetic radiation.

A portion or portions of the layer that are not exposed to the electromagnetic radiation can be removed by contacting the layer after the contacting with a solvent. Any solvent in which the components of the layer are soluble can be used.

Various substrates can be used. A substrate provides local heating when contacted with electromagnetic radiation as described herein. Examples of substrates include, but are not limited to, silicon substrates.

In an aspect, the present method provides hierarchically porous structures. The hierarchically porous structures can be hierarchically porous resin structures. A layer (e.g., a film) can comprise one or more hierarchically porous structures. The hierarchically porous structures can be three-dimensional, continuous hierarchically porous structures. The hierarchically porous structures can be three-dimensional, continuous hierarchically porous network structures. The pores of the hierarchically porous structures can be mesoscopic to macroscopic shapes. The pores can correspond to the domains of positive tone material that are thermally degraded. The hierarchically porous structures are referred to herein as B-WRITE structures. In various examples, a hierarchically porous structure is made by a method of the present disclosure.

The hierarchically porous structures can have pores having various sizes, morphologies, and distributions of pores. In an example, the hierarchically porous structures (e.g, a layer comprising the hierarchically porous structures) have a porosity of 30 and 80 volume percent (vol %), including all integer vol % values and ranges therebetween. In various other examples, the hierarchically porous structures (e.g, a layer comprising the hierarchically porous structures) has a porosity of 30-75 vol %, 30-70 vol %, 30-65 vol %, 30-60 vol %, 30-55 vol %, 30-50 vol %, 30-45 vol %, 30-40 vol %, or 30-35 vol %. In an example, the hierarchically porous structures (e.g, a layer comprising the hierarchically porous structures) have a pore volume of between about 0.25 and about 2 $cm^3$ $g^{-1}$, including all 0.01 $cm^3$ $g^{-1}$ values and ranges therebetween. In various other examples, the hierarchically porous structures (e.g., a layer comprising the hierarchically porous structures) have a pore volume of 0.25-1.9 $cm^3$ $g^{-1}$, 0.25-1.8 $cm^3$ $g^{-1}$, 0.25-1.7 $cm^3$ $g^{-1}$, 0.25-1.6 $cm^3$ $g^{-1}$, 0.25-1.5 $cm^3$ $g^{-1}$, 0.25-1.4 $cm^3$ $g^{-1}$, 0.25-1.3 $cm^3$ $g^{-1}$, 0.25-1.2 $cm^3$ $g^{-1}$, 0.25-1.1 $cm^3$ $g^{-1}$, 0.25-1.0 $cm^3$ $g^{-1}$, 0.25-0.9 $cm^3$ $g^{-1}$, 0.25-0.8 $cm^3$ $g^{-1}$, 0.25-0.7 $cm^3$ $g^{-1}$, 0.25-0.6 $cm^3$ $g^{-1}$, 0.25-0.5 $cm^3$ $g^{-1}$, 0.25-0.4 $cm^3$ $g^{-1}$, 0.25-0.3 $cm^3$ $g^{-1}$, or 0.25-0.2 $cm^3$ $g^{-1}$.

Pore volume and porosity can be calculated using methods known in the art. For example, pore volume can be obtained from the amount of nitrogen adsorbed at a relative pressure of 0.99. The porosity can be calculated using the specific volume for carbon (inverse carbon density) of 0.5 $cm^3/g$ with the formula: Porosity (vol %)=Pore Volume ($cm^3/g$)/(Pore Volume ($cm^3/g$)+0.5 $cm^3/g$)×100.

The structures formed by the present methods can have thin film morphology having three-dimensional disordered continuous structures. Other morphologies can include periodic lamellar, standing and lying hexagonal, gyroid, cubic structures, as well as alternative disordered wormlike and micellar structures. The present structures can have macroscopic line patterns that are 2 centimeter long and 1 millimeter wide and 1 micrometer thick. The structures be scaled up to tens to hundreds of centimeters long and wide, as well as tens to hundreds of micrometer thick, by changing the laser system optics to increase the focused laser beam size to enable lager scanned areas. The structures can be scaled down to several tens of micrometer in length and width by laser heating through a photomask to generate arbitrary patterns of higher resolutions.

The hierarchically porous structures can be used as a template for formation of structures having the inverse pattern of the hierarchically porous structures (e.g., by transient laser annealing). In an example, the structures having the inverse pattern of the hierarchically porous structures are formed without templating the structures with/into materials such as, for example, inorganic materials.

The porous resin structures can be used as templates. A material can be deposited on the porous resin structures and the materials take at least a portion or all of the shape of the porous resin structure. At least a portion or all of the resin structure can be removed after the material is deposited forming a material corresponding to a negative image of the porous resin structure. Examples of materials include inorganic materials such as, for example, silicon and the like. The material can be crystalline, amorphous, or polycrystalline. The as deposited material can be subjected to or more additional processes (e.g., before or after removal of the porous resin structure template). For example, an amorphous material (e.g., amorphous silicon) can be annealed (e.g., laser annealed) to provide a crystalline or polycrystalline material. The materials can be deposited by methods known in the art.

In an example, a method further comprises deposition of a material on the porous resin structures, where the material at least partially fills or fills a portion of or all of the pores in the porous resin structures and, optionally, the porous resin structure is removed. For example, a 3D porous nanostructure of the material having the inverse image of the porous resin structure is formed.

In one embodiment, this disclosure provides a method of making a hierarchically porous structure comprising: a) forming a layer comprising a positive tone material and a negative tone material on at least a portion of a surface of a substrate, wherein the positive tone material self assembles providing structured domains, which may be hierarchical, and b) exposing at least a portion of the layer to electromagnetic radiation, wherein at least a portion of the positive tone material in the portion of the layer exposed to the electromagnetic radiation decomposes forming the hierarchically porous structure. Step b) may be repeated a desired number of times. Step b can be carried out by rastering a laser beam across the layer. The electromagnetic radiation can be provided by a laser, such as a carbon dioxide ($CO_2$) laser. A $CO_2$ laser typically has a principal wavelength band at 10.6 microns. Examples of pore sizes formed can be from 10 nm to 500 nm or 10 nm to 600 nm.

In one embodiment, this disclosure provides a method of making a hierarchically porous structure comprising: a) forming a layer comprising a first polymeric material and a second polymeric material on at least a portion of a surface of a substrate, wherein the first polymeric material self assembles providing structured domains, which may be hierarchical, and b) exposing at least a portion of the layer to electromagnetic radiation, wherein at least a portion of the first polymeric material in the portion of the layer exposed to the electromagnetic radiation decomposes forming the hierarchically porous structure. Step b) may be repeated a desired number of times. Step b can be carried out by rastering a laser beam across the layer. The electromagnetic radiation can be provided by a laser, such as a carbon dioxide ($CO_2$) laser. A $CO_2$ laser typically has a principal wavelength band at 10.6 microns. Examples of pore sizes formed can be from 10 nm to 500 nm or 10 nm to 600 nm.

This disclosure provides materials having a hierarchically porous structure. For example, the materials can be made by a method which comprises: a) forming a layer comprising a first polymeric material (which may be a positive tone material) and a second polymeric material (which may be a negative tone material) on at least a portion of a surface of a substrate, wherein the first polymeric material self assembles providing structured domains, which may be hierarchical, and b) exposing at least a portion of the layer to electromagnetic radiation, wherein at least a portion of the first polymeric material in the portion of the layer exposed to the electromagnetic radiation decomposes forming the hierarchically porous structure. The materials can comprise pores in the nanometer range, such as from 10 nm to 500 nm or 10 nm to 600 nm.

The steps of the method described in the various embodiments and examples disclosed herein are sufficient to carry out the methods of the present disclosure. Thus, in an embodiment, a method consists essentially of a combination of the steps of the methods disclosed herein. In another embodiment, a method consists of such steps.

In an aspect, the present disclosure provides uses of the hierarchically porous structures. For example, a device comprises on or more hierarchically porous structures or one or more layer comprising hierarchically porous structures.

Examples of devices include microfluidic devices. The microfluidic devices can be used in sensing and/or catalysis applications.

The following examples are presented to illustrate the present disclosure. They are not intended to limiting in any matter.

Example 1

This example provides a description of methods of the present disclosures and structures of the present disclosure.

We demonstrate a simple and rapid method for direct generation of 3D continuous hierarchically porous structures with meso- to macroscopic shapes by combining BCP self-assembly-directed resols structure formation with $CO_2$ laser-induced transient heating. A schematic of the BCP-based writing induced by transient heating experiments (B-WRITE) is shown in FIG. 1A. Lab-synthesized ABC triblock terpolymers [poly(isoprene)-block-poly(styrene)-block-poly(ethylene oxide), ISO-38/69] as well as commercially available ABA di-BCPs (Pluronic F127) were used as examples. Oligomeric resols were synthesized by the polymerization of resorcinol/phenol and formaldehyde under basic conditions. The structure-directing BCP was first mixed with resols to form an all-organic hybrid thin film by spin-coating on a silicon substrate. Samples are designated as BCP-M-R, where M represents BCP molar mass and R denotes the resols additives. As-deposited or thermally cured films were then heated by a continuous wave $CO_2$ laser ($\lambda$=10.6 µm), focused into a ~90 µm by 600 µm line beam, and scanned to generate a 0.5-ms dwell in air. Although the organic layer does not interact strongly with the far-infrared photons, the boron-doped Si substrate absorbs most of the laser energy thereby heating the film. As the laser passes, cooling occurs by thermal conduction on submillisecond timeframes. Laser heating temperatures were determined using a procedure described in. Well-defined porous resin structures were formed by the simultaneous thermopolymerization of resols (negative-tone) and decomposition of BCPs (positive-tone) during transient heating by sequential $CO_2$ laser irradiations at locations predefined by the beam. Material in nonirradiated regions could be removed by rinsing with solvent leaving resulting porous resin structures on the substrate.

Thermal stability was compared for organic films prepared from 5 weight percent (wt %) ISO-69, 5 wt % resols and 6 wt % ISO-38/69-R solutions in tetrahydrofuran (THF) spin-coated on Si (FIG. 1B). The 6 wt % ISO-38/69-R hybrid thin films were prepared by mixing 2 to 3 parts ISO to 1 part resols in THF by mass (see Table 1 for hybrid compositions). After thermal curing in vacuum at 100° C. overnight (>12 h), films were heated in air by either a single $CO_2$ laser irradiation for 0.5-ms dwell or furnace heating for 1 hour. Curves in FIG. 1B show film thickness as a function of temperature (and corresponding laser power). Under $CO_2$ laser heating for 0.5-ms dwell, ISO-69 remained stable up to 550° C. (35 W) and thermally decomposed entirely above 670° C. (>40 W). Resols films extensively crosslinked, retaining more than 50% of the original film thickness at 670° to 805° C. (40-45 W). For ISO-69-R hybrid films mixed behavior was observed. This suggested a laser heating process window to decouple BCP decomposition but retain the crosslinked resols (resin).

Figure 5:
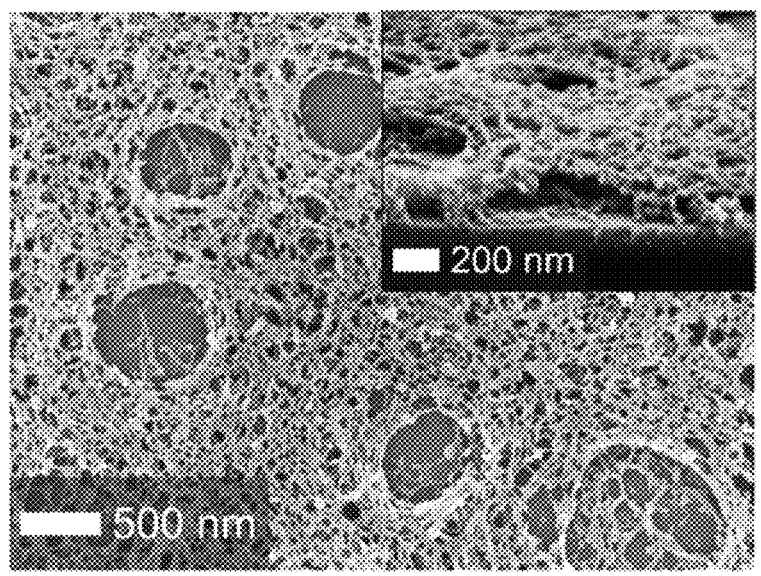
FIG. 5. Laser-heated resin structure. SEM plan view and cross-sectional (inset) micrographs of 6 wt % ISO-69-R nanoporous resin structure generated by a single $CO_2$ laser irradiation at 670° C. for 0.5 ms dwell in air.

Initial experiments to generate nanoporous resin structures in ISO-69-R films by a single $CO_2$ laser irradiation with ISO decomposition at 670° C. (40 W) for 0.5-ms dwell confirmed these concepts (FIG. 5). Thermal stability of ISO-69-R films was increased dramatically by more than 400° C. when heating duration was reduced from 1 hour in a furnace to 0.5 ms with $CO_2$ laser-induced heating (FIG. 1B). Submillisecond timeframe $CO_2$ laser heating suppresses oxidation reactions in ambient environments enabling organic systems to reach temperatures inaccessible by conventional heating.

Figure 2:
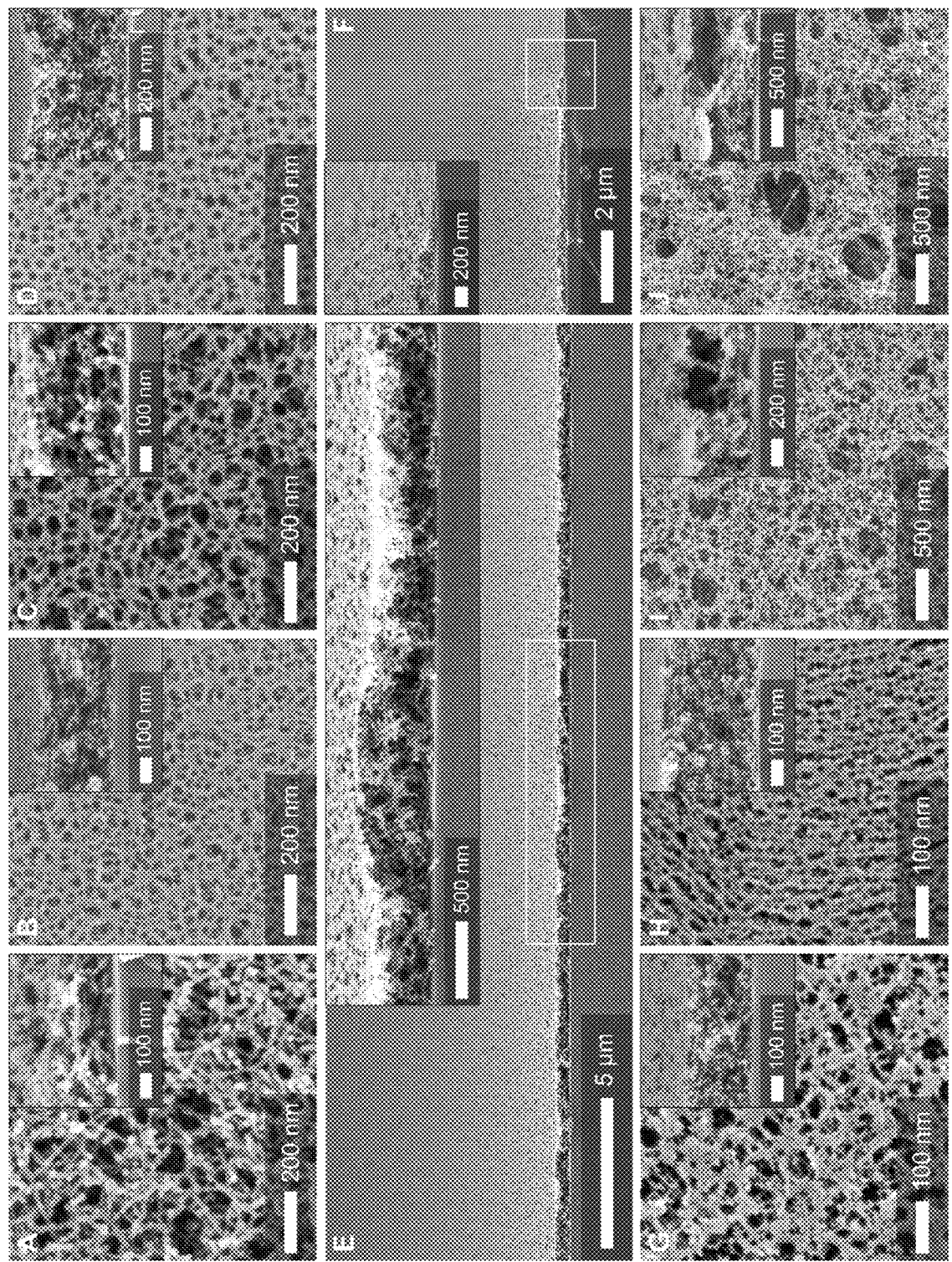
FIG. 2. SEM of B-WRITE resin structures. (A to D) Plan views and cross-sections (insets) of laser-heated 6 wt % ISO-38-R [(A) and (B)] and 6 wt % ISO-69-R [(C) and (D)] solution-derived structures of 2 to 3:1 [(A) and (C)] and 1.5:1 [(B) and (D)] ISO/resols mass ratios, respectively. (E and F) Lower magnification images of same sample as in (C). (G and H) Plan views and cross-sections (insets) of laser-heated 20 wt % F127-R solution-derived structures of 1:1 (G) and 1:2 (H) F127/resols mass ratios, respectively. (I and J) Plan views and cross-sections (insets) of laser-heated 10 wt % (I) and 12.5 wt % (J) ISO-38-R solution-derived structures.
Figure 6:
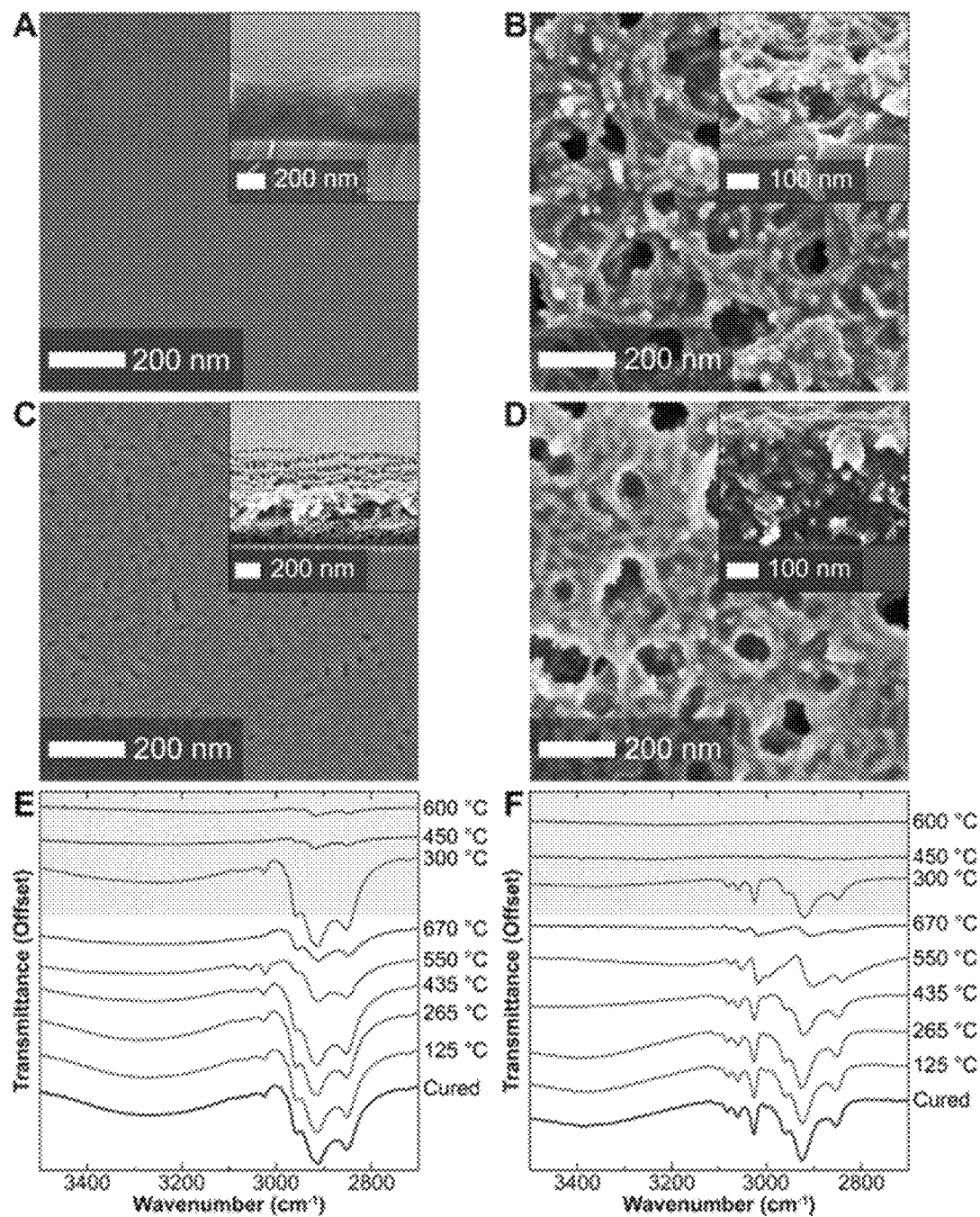
FIG. 6. SEM and FTIR of ISO-resols samples under heat treatments. (A to D) Plan views and cross-sections (insets) of 6 wt % ISO-38-R (A and B) and 6 wt % ISO-69-R (C and D) solution derived hybrids of 2-3:1 ISO/resols mass ratios: after curing at 100° C. (A and C); after sequential $CO_2$ laser irradiations of 0.5 ms dwell in air at 550° C. (B and D). (E and F) FTIR spectra of cured ISO-38-R (E) and ISO-69-R (F) hybrid samples heated by sequential $CO_2$ laser irradiations of 0.5 ms dwell in air (white background regions) and by furnace heating under $N_2$ for ≥1 hour (grey background regions), measured in attenuated total reflectance and specular reflectance modes, respectively, after baseline subtraction. The parent cured ISO-38/69-R hybrid samples ("Cured" curves) display multiple peaks in two wavenumber bands: (1) hydroxyl stretching vibrations in 3500-3200 $cm^{-1}$ band assigned to the hydrogen bonds and free phenolic hydroxyl groups; (2) alkyl stretching vibrations in 3000-2800 $cm^{-1}$ band assigned to the ISO terpolymers. For $CO_2$ laser-induced transient heating (white background), the hydroxyl peak began to decrease from ambient to 670° C. due to crosslinking of resols. The alkyl peaks of ISO terpolymers significantly diminished from 550 to 670° C. indicating ISO decomposition to form B-WRITE nanoporous resin structures (600° C., 450° C., 670° C. curves). For furnace heating under $N_2$ (grey background), the strong hydroxyl and alkyl stretching vibration peaks indicate the ISO-resols hybrid samples remained stable at 300° C. In contrast, by 450° C., the peaks have mostly disappeared indicating decomposition of ISO terpolymers and formation of mesoporous resin structures (600° C., 450° C., ° 670 Ccurves). Weak peaks in the 3000-2800 $cm^{-1}$ band at 450 and 600° C. in (E) are attributed to the aromatic alkyl stretching vibrations.

For more controlled polymerization of resols and to inhibit thermocapillary dewetting effects, we introduced sequential $CO_2$ laser irradiations of increasing laser powers yielding thicker resin structures with similar enhanced thermal stability (FIG. 1C), but high film uniformity and coverage (FIG. 1, D and E). Scanning electron microscopy (SEM, FIG. 2 and FIG. 6) and Fourier transform infrared (FTIR) spectroscopy (FIG. 6) were employed to investigate film morphology and chemical composition, respectively. Upon sequential irradiations, cured ISO-resols hybrid films (FIG. 6, A and C) densified due to crosslinking of resols with increasing transient temperatures, whereas above 550° C. BCP decomposition occurred (FIG. 6, B and D), and was completed at about 670° C. (FIG. 2, A and C). This is corroborated by decreasing IR signal intensities of hydroxyl stretching vibrations in the 3500 to 3200 $cm^{-1}$ band and a sharp reduction of IR signal intensities of alkyl stretching vibrations in the 3000 to 2800 $cm^{-1}$ band, respectively (FIG. 6, E and F). Resulting resin structures retained ~30 to 55% of the original film thickness (FIG. 1C).

Figure 7:
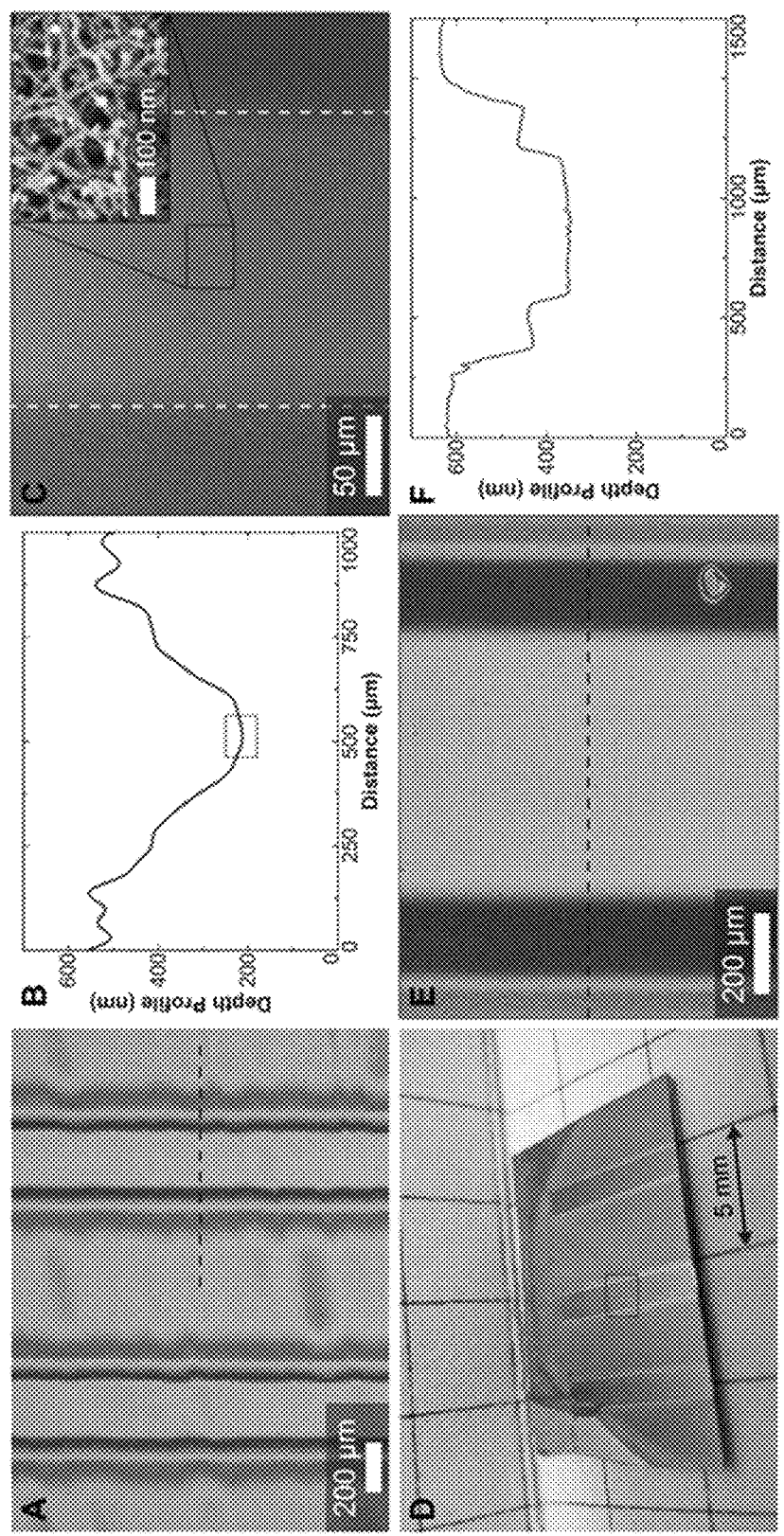
FIG. 7. Characterization of trenches in ISO-resols hybrid samples by B-WRITE method. (A to C) Optical image (A), depth profile (B), and plan view SEM micrographs (C) of laser-heated macroscopic trenches in a 6 wt % ISO-38-R hybrid sample. The small rectangle in the profilometry cross-section (B) indicates the position of the B-WRITE porous resin structure depicted in the plan view SEM (C). The white dashed lines in (C) highlight the contrast difference formed by $CO_2$ laser-induced transient heating. Inset shows the nanoporous resin network structure at higher magnification. (D to F) Optical images (D and E) and depth profile (F) of laser-heated macroscopic trenches in a 6 wt % ISO-69-R hybrid sample. The small rectangle in (D) indicates the position of the plan view optical image at higher magnification displayed in (E). The black dashed lines in the optical images (A and E) indicate positions of the profilometry scans leading to the corresponding depth profiles (B and F).

Optical images in FIG. 1D and FIG. 7 show macroscopic linear trenches in ISO-38/69-R hybrid thin films generated by sequential $CO_2$ laser irradiations for 0.5 ms in air (B-WRITE method). Each ISO-38-R-based trench was ~2 cm long requiring ~4.5 minutes to fabricate in air (FIG. 1D). SEM (FIG. 1E) and profilometry (FIG. 7B) show that the ~150-µm-wide B-WRITE trench indeed consists of a ~200-nm-thick nanoporous resin thin film. Laser-heated macroscopic shape dimensions are tunable, as demonstrated for ISO-69-R hybrid films with ~350-nm-thick structures in ~550-µm-wide B-WRITE trenches (FIG. 7F). Cross-sectional SEM at lower magnifications in FIG. 2, E and F, shows highly uniform structure formation under these conditions over large areas as defined by the $CO_2$ laser.

Figure 8:
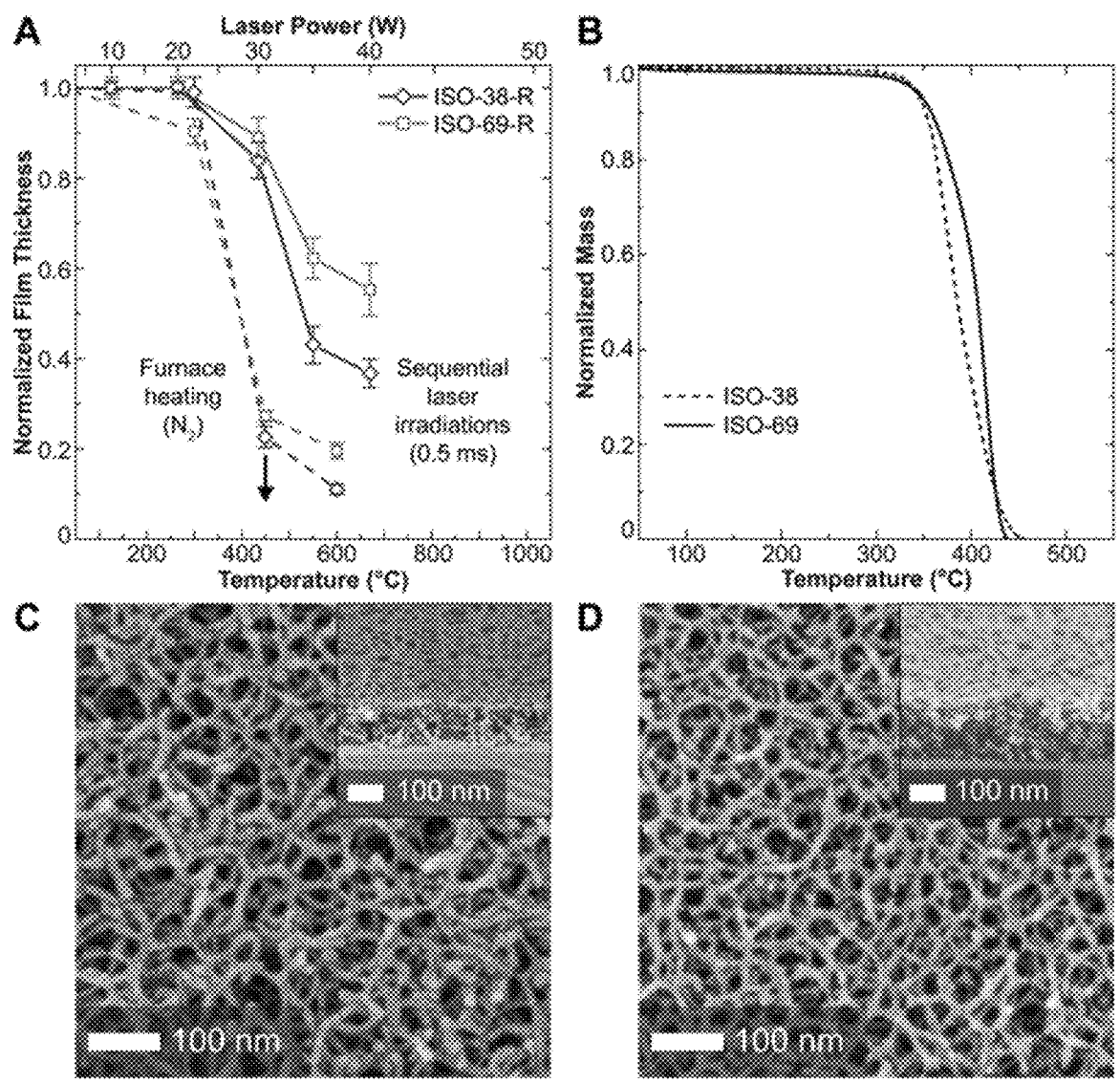
FIG. 8. Film thickness, thermogravimetric, and SEM analysis of ISO-directed mesoporous resin structures. (A) Thickness plots of 6 wt % ISO-38/69-R hybrid thin films heated by furnace heating under $N_2$ for ≥1 hour (dashed lines) and sequential $CO_2$ laser irradiations of 0.5 ms dwell in air (solid lines). (B) Thermogravimetric analysis (TGA) of ISO-38/69 terpolymers measured at a heating rate of 5° C./minute in an inert atmosphere (helium). (C and D) Plan view and cross-sectional (inset) SEM micrographs of mesoporous resin structures generated by furnace heating under $N_2$ for 1 hour at 450° C. for ISO-38-R (C) and ISO-69-R (D) with ISO/resols mass ratios of 2-3:1. TGA, SEM and FTIR (FIG. 6) indicate that $N_2$-furnace-heated mesoporous resin structures were formed after the decomposition of ISO terpolymers around 450° C., retaining approximately 20-30% of the original thickness in this inert environment.
Figure 9:
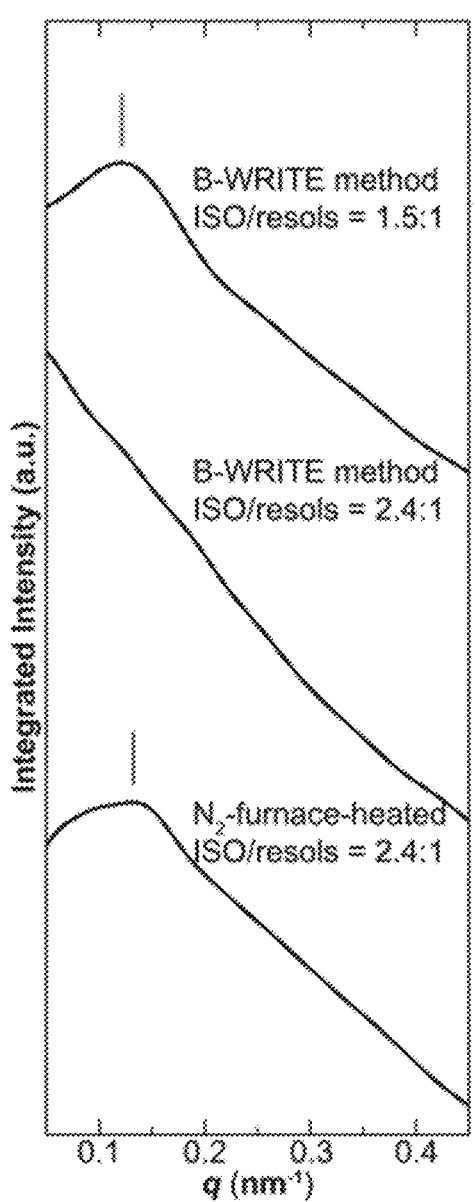
FIG. 9. Fast Fourier transform (FFT) analysis of SEM images of porous resin structures. Radially integrated FFT analysis of plan view SEM images of ISO-69-R nanoporous resin structures heated by B-WRITE method in air and furnace heating under $N_2$ as indicated. The peak in the bottom curve of furnace-heated mesoporous resin structure pyrolyzed at 450° C. for 1 hour under $N_2$ corresponds to an in-plane lattice spacing of $2\pi/q \approx 47$ nm, see FIG. 8D. Laser-heated porous resin structures generated by the B-WRITE method in air were macroscopically inhomogeneous for an ISO-69/resols mass ratio of 2.4:1, see FIG. 2C, and did not display a peak in the FFT analysis (middle curve). When the ISO-69/resols mass ratio was reduced to 1.5:1, homogeneous mesoporous resin structures were generated by the B-WRITE method, see FIG. 2D. The peak of the top FFT curve for laser-heated mesoporous resin structures with ISO/resols mass ratio of 1.5:1 corresponds to an in-plane lattice spacing of $2\pi/q \approx 52$ nm.

Resulting pore size and pore size distribution could be tailored by tuning hybrid film composition. Sequential $CO_2$ laser-heated resin structures formed in the submillisecond timeframes were compared with mesoporous structures formed by furnace heating under $N_2$ for ≥1 hour (FIG. 8). The average pore size of the $N_2$-furnace-heated ISO-69-R structures at 450° C. is 39±9 nm with an in-plane lattice spacing of ~47 nm (FIG. 9). Laser-heated structures obtained from ISO-69-R hybrid films with the same ISO-to-resols mass ratio of 2.4:1 show a wide pore size distribution with values ranging from ~30 to 200 nm (FIG. 2C). The increase in pore size relative to the $N_2$-furnace-heated sample is ascribed to rapid evolution and release of gaseous decomposition products during transient heating resulting in local pore expansion. Hybrid film composition provides a convenient lever to tune pore size of B-WRITE structures. For example, FIG. 2D shows that the pore diameter of laser-heated ISO-69-R films was reduced to ~20 to 50 nm by decreasing the ISO-to-resols mass ratio to 1.5:1 (see FIG. 2B for ISO-38-R). From fast Fourier transform analysis, the in-plane lattice spacing was ~52 nm—i.e., close to the value obtained after furnace heating under $N_2$ (FIG. 9).

Terpolymers are synthetically challenging, so BCPs were varied to also include the commercially available Pluronics family. Smaller molar mass Pluronic F127 copolymer mixed with resols at 1:1 mass ratio in ethanol led to the formation of resin structures with pore sizes of 20 to 50 nm (FIG. 2G). Pore size and pore size distribution were further reduced to 10 to 30 nm by decreasing the F127-to-resols mass ratio to 1:2 (FIG. 2H) thereby approaching the 5 to 10 nm limit of size control in conventional BCP phase separation. Film thickness could be tuned via solution concentration. For example, maintaining ISO-38-to-resols mass ratio at 3:1, sample thickness was increased with the mixed solution concentration (Table 1) from ~500 nm (6 wt %) to 1.0 µm (10 wt %) and 1.6 µm (12.5 wt %). FIG. 2, I and J, show thicker laser-heated structures with hierarchical pore size distributions of 50 to 400 nm and 50 to 600 nm for 10 wt % and 12.5 wt % solution-derived ISO-38-R samples, respectively. B-WRITE-based porous structures may be accessible for films thicker than 1.6 µm by further optimizing laser heating protocols.

Figure 3:
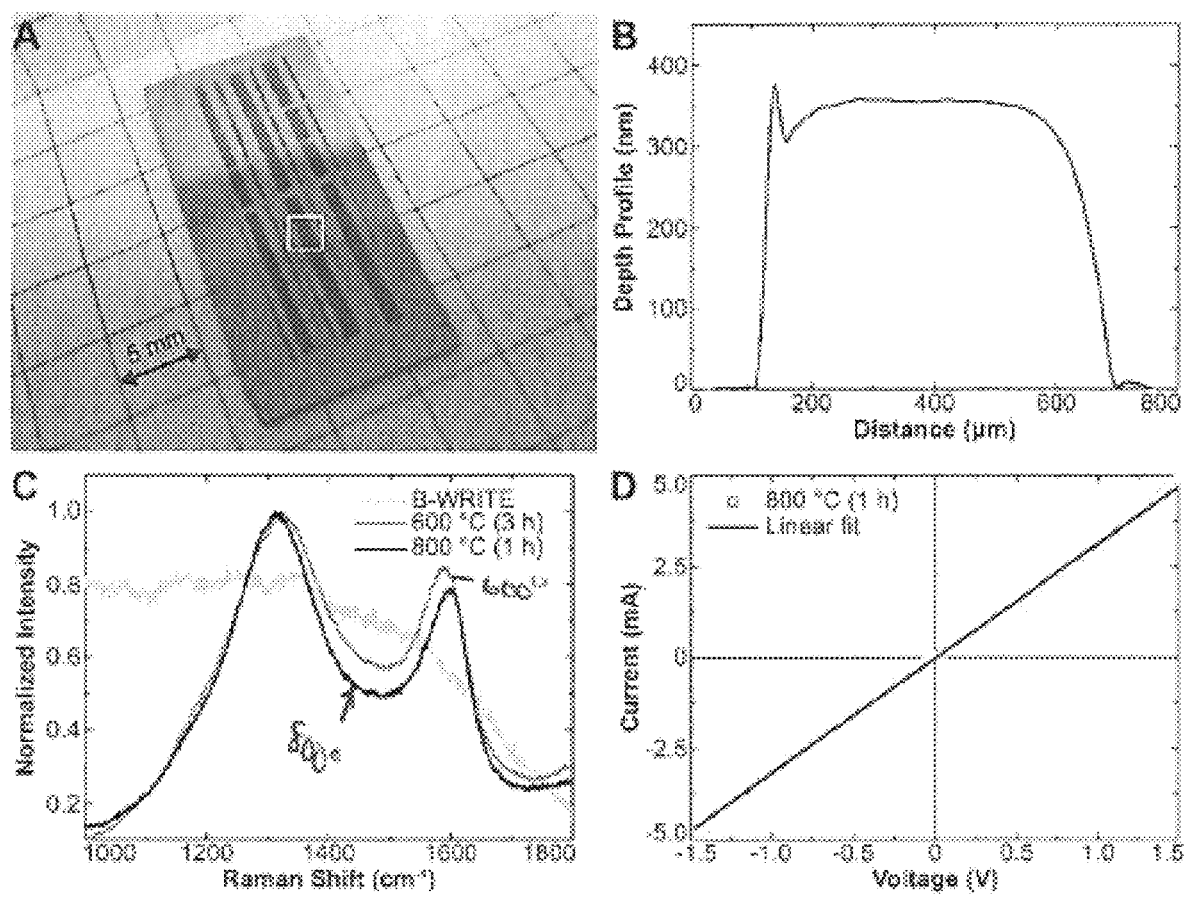
FIG. 3. Macroscopic pattern inversion and carbonization of B-WRITE structures. (A and B) Optical image of complex shapes (A) and corresponding depth profile (B) of laser-heated ISO-69-R after THF rinsing. Depth profile was acquired in the region denoted in (A). (C) Raman spectra (785 nm excitation) of laser-heated ISO-69-R formed by B-WRITE (light grey), and after carbonization at 600° C. (grey) and 800° C. (black). (D) Current/voltage plot of laser-heated porous carbon sample carbonized at 800° C.

Skipping the 100° C. thermal curing step and directly laser-heating as-deposited ISO-resols samples achieved further process simplification. FIG. 3A displays macroscopic porous resin lines on a clean Si substrate prepared by subjecting as-deposited ISO-69-R samples to an increased number of sequential $CO_2$ laser irradiations and removal of non-irradiated components by rinsing with THF (see stage III in FIG. 1A and SEM in FIG. 10A). Selective removal of resin material with a single $CO_2$ laser irradiation at 30 W of 25-ms dwell enabled macroscopic line-width adjustments and sidewall smoothening (see SEM in FIG. 2F and depth profile in FIG. 3B). More complex shapes were generated by removal of resin using laser scans in other directions, as shown for orthogonal scans in FIG. 3A.

Figure 10:
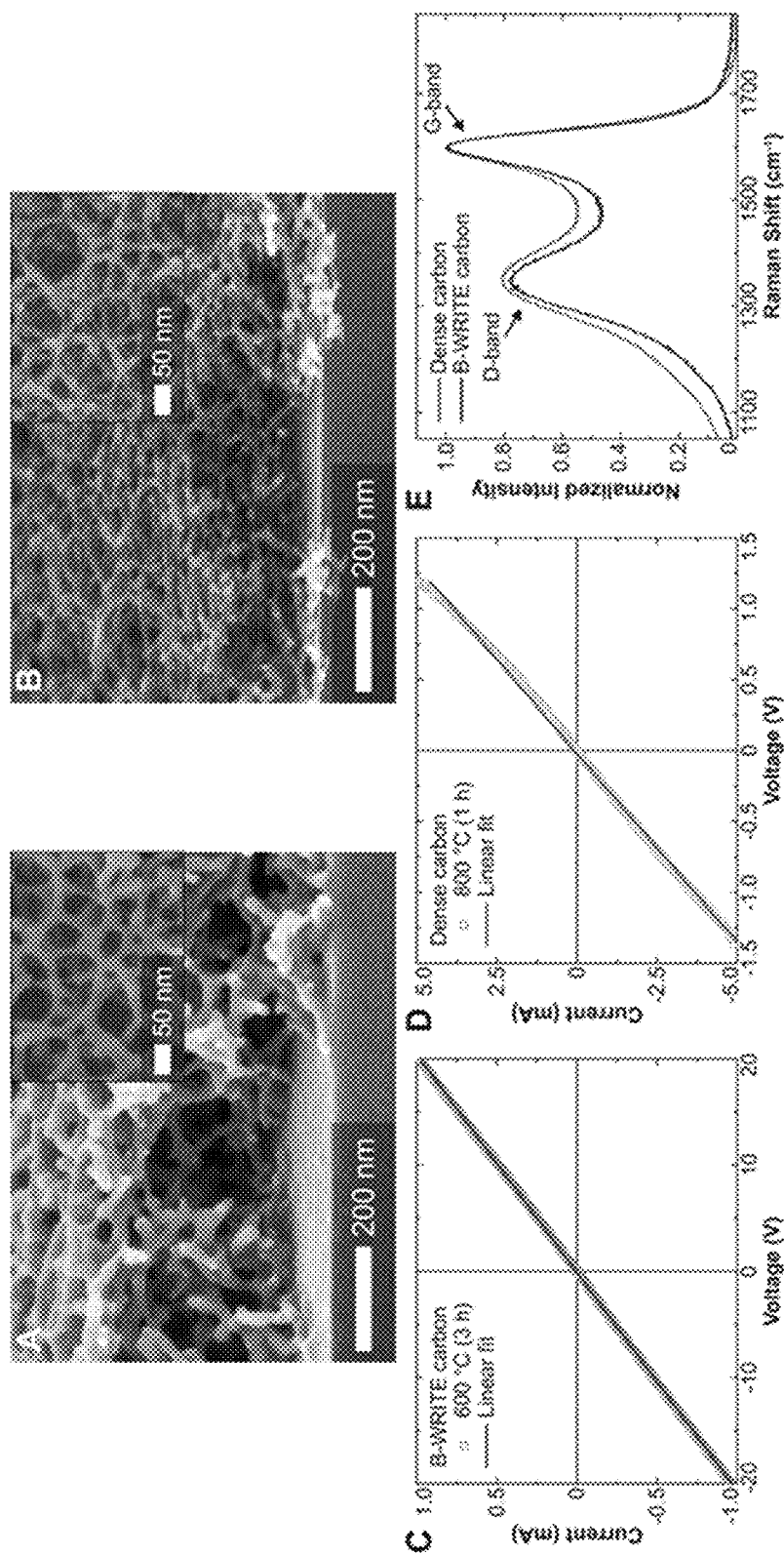
FIG. 10. SEM, electrical conductivity and Raman spectroscopy measurements of carbonized samples. (A and B) Cross-sectional and plan view (insets) SEM micrographs of laser-heated ISO-69-R structures after THF rinsing (A) and after carbonization at 800° C. for 1 hour under $N_2$ (B). (C and D) Four-point probe current/voltage measurement of a laser-heated ISO-69-R nanoporous carbon sample furnace heated at 600° C. for 3 hour under $N_2$ (C) is compared to that of a dense resols derived carbon film furnace heated at 800° C. for 1 hour under $N_2$ (D). (E) Raman spectra, using a 488 nm excitation laser source, of laser-heated ISO-69-R nanoporous carbon sample ("B-WRITE carbon" curve) and dense resols derived carbon film ("Dense carbon" curve) after carbonization at 800° C. for 1 hour under $N_2$. The narrower bands and higher intensity ratio suggest a higher degree of graphitization for the laser-treated nanoporous carbon sample compared to that of the dense carbon film. These effects were quantified by fitting the respective Raman spectra between 1050 and 1850 $cm^{-1}$ using two peaks, a Lorentzian function for the D-band and a Breit-Wigner-Fano (BWF) function for the G-band, resulting in: (1) full-width-half-maximum (FWHM) values, as well as (2) ratios of integrated intensities ($I_G/I_D$) between the two bands. Values for the laser-heated nanoporous carbon sample ("B-WRITE carbon" curve) are: (1) 186.4 $cm^{-1}$, 98.7 $cm^{-1}$, and (2) 0.80, respectively; while values for the dense carbon sample are: (1) 221.4 $cm^{-1}$, 106.3 $cm^{-1}$, and (2) 0.77, respectively.

A final furnace heating step under $N_2$ at temperatures up to 800° C. resulted in carbonized and electrically conductive nanoporous carbon films without structure collapse. Raman spectroscopy shown in FIG. 3C indicated negligible graphitic carbon in laser-heated ISO-69-R samples, corroborating the organic nature of the B-WRITE porous resin structures. After furnace heating at 600° C., D and G bands centered at ~1325 and 1588 $cm^{-1}$, respectively, appeared in the Raman spectrum indicating the conversion of phenolic resins into disordered carbon. At 800° C., D and G bands narrowed and shifted to ~1314 and 1598 $cm^{-1}$, respectively, suggesting a higher degree of graphitization. Cross-sectional SEM (FIG. 10B) revealed that B-WRITE structures contracted by 50 to 60% in the out-of-plane direction during carbonization at 800° C., but otherwise stayed intact. The electrical conductivity of B-WRITE films carbonized at 600° C. and 800° C. under $N_2$ was ~8 S/cm (FIG. 10C) and 270 to 750 S/cm (FIG. 3D), respectively. This electrical conductivity is higher than that of dense carbon samples heated under identical conditions at 800° C. (~52 S/cm) (FIG. 10D), but lower than polycrystalline graphite (1250 S/cm). The high electrical conductivity of B-WRITE carbon structures after furnace heating is attributed to the connectivity of the 3D continuous network. We speculate that porosity facilitates carbonization and release of oxygen/hydrogen species to form graphitic-like clusters, but other mechanisms are possible (FIG. 10E).

Figure 4:
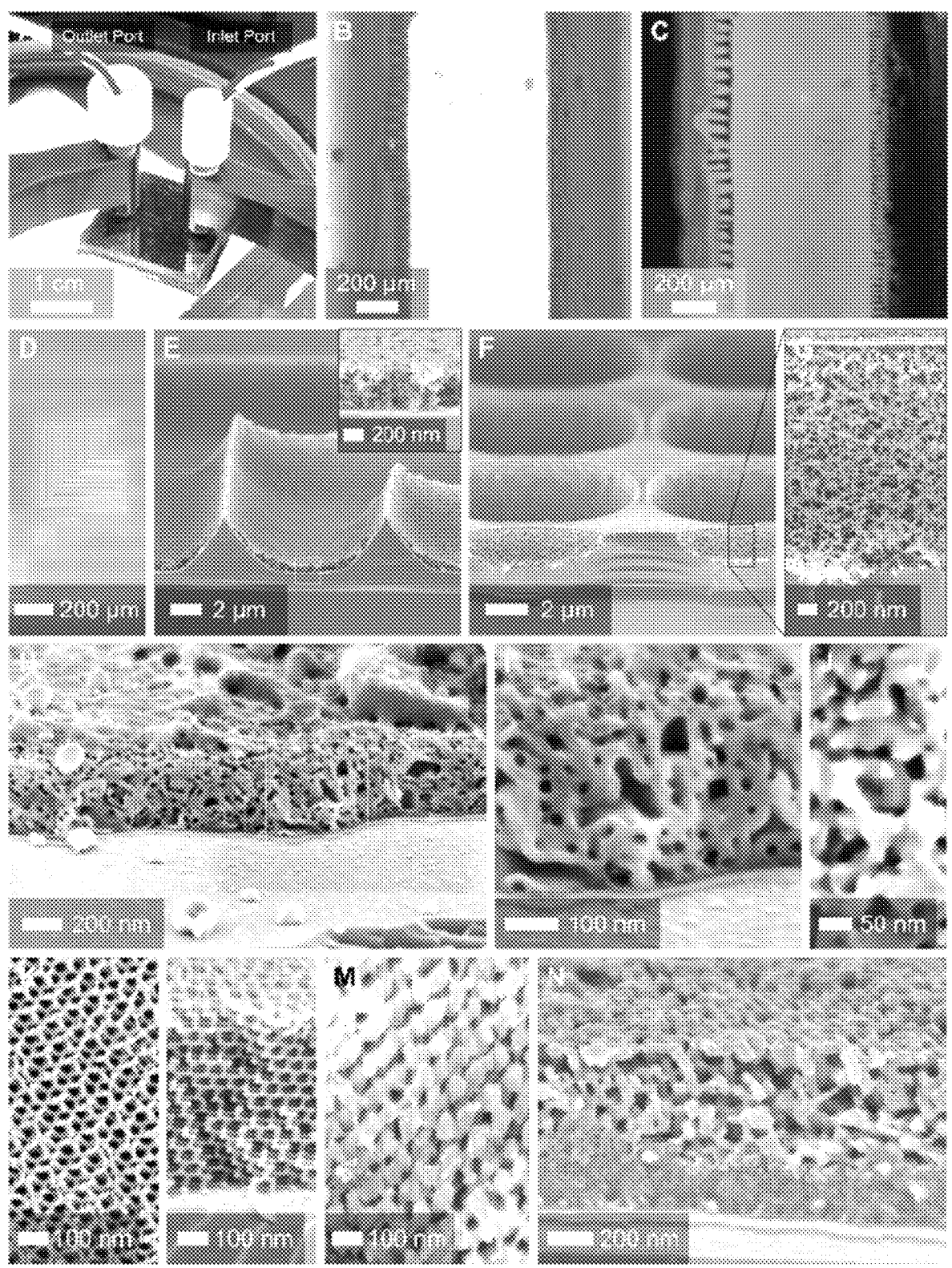
FIG. 4. Hierarchical porous resin structure formation and use in microfluidic device, on lithographically defined surfaces, as well as for pattern transfer into Si. (A) Optical image of a microfluidic device fabricated by $CO_2$ laser writing on the probe station. (B and C) Bright-field (B) and fluorescence (C) optical micrographs of TRITC dye dissolved in DMSO passing through the microfluidic channel. (D to N) SEM micrographs. Plan view (D) and cross-sections [(E) to (G)] of hierarchical structures from coupling photolithography, BCP-directed self-assembly, and $CO_2$ laser heating. Inset in (E) shows the identified area at higher magnification. Cross-section of excimer laser-induced crystalline Si nanostructures employing B-WRITE-derived organic template (H). Higher resolution cross-section (I) and plan view (J) of area as indicated in (H). Plan views [(K) and (M)] and cross-sections [(L) and (N)] of periodically ordered mesoporous gyroidal resin template [(K) and (L)], and resulting excimer laser-induced crystalline Si nanostructures after template removal [(M) and (N)].
Figure 11:
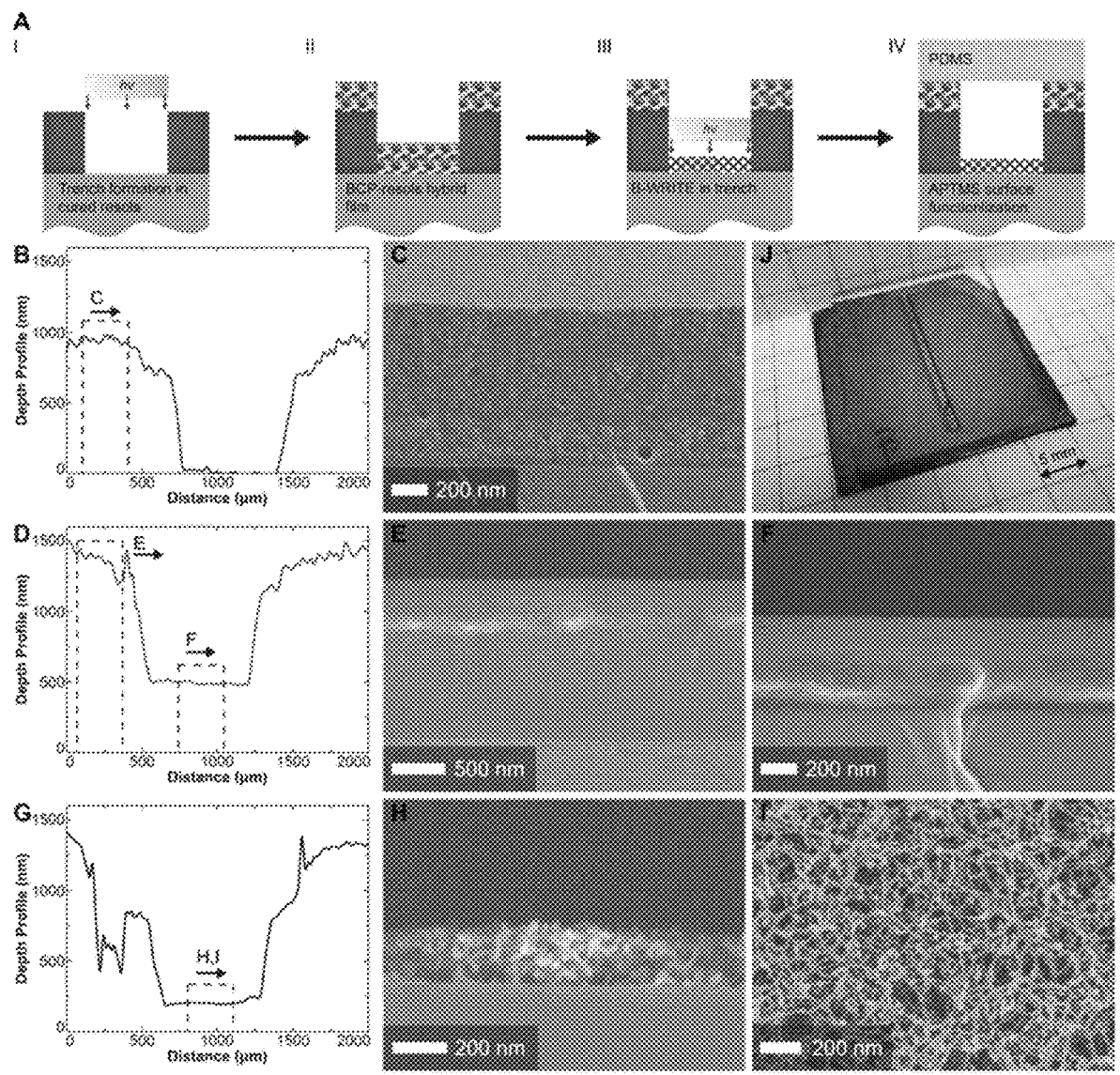
FIG. 11. Microfluidic device fabrication by $CO_2$ laser writing. (A) Schematic process representation. A dense resols film was spin-coated on a Si substrate and cured at 100° C., followed by trench formation in the dense film with a single $CO_2$ laser irradiation at 30 W with a 25 ms dwell (stage I). An ISO-38-R hybrid film was deposited as an overlayer and cured at 100° C. (stage II). Laser-heated porous resin network structures were formed in the trench by the B-WRITE method (stage III). The device was sealed with a ~2-mm-thick polydimethylsiloxane (PDMS) film after (3-aminopropyl)-trimethoxysilane (APTMS) surface functionalization (stage IV). (B and C) Depth profile (B) and cross-sectional SEM micrograph (C) at stage I. (D to F) Depth profile (D) and cross-sectional SEM micrographs (E and F) at stage II. (G to I) Depth profile (G), cross-sectional (H) and plan view (I) SEM micrographs at Stage III. (J) Optical image of the completed microfluidic device at stage IV.

We constructed proof-of-concept microfluidic devices with highly porous organic channel floors for potential sensing or catalysis applications (FIG. 4, A to C, and FIG. 11). A dense resols film was spin-coated onto Si and cured at 100° C. A trench was then formed with a single $CO_2$ laser irradiation at 30 W of 25-ms dwell, completely decomposing the film, followed by spin-coating a 6 wt % ISO-38-R film as an overlayer. B-WRITE application formed nanoporous resin structures in the trench. The device was finally sealed with a polydimethylsiloxane film (FIG. 4A). From optical and electron microscopy, as well as profilometry, the microfluidic device channel was ~13 mm long (port-to-port), 630 µm wide and 1.4 µm tall, containing ~200-nm-thick nanoporous resin structures at the channel bottom increasing surface area (FIG. 11). Bright field and fluorescence optical micrographs in FIG. 4, B and C, confirmed that tetramethylrhodamine (TRITC) dye dissolved in dimethyl sulfoxide (DMSO) was flowing through the microfluidic channel using a pressure-controlled pump.

We further demonstrated compatibility of the B-WRITE method with complex substrates obtained from established semiconductor processing technologies. FIG. 4D displays a SEM plan view micrograph of an ISO-69-R hybrid sample deposited on a photolithographically patterned Si substrate and transformed into porous resin structures by the B-WRITE method. Cross-sectional SEM in FIG. 4, E to G, shows excellent conformal adhesion of the laser-derived structures despite the complex Si surface topography.

Figure 12:
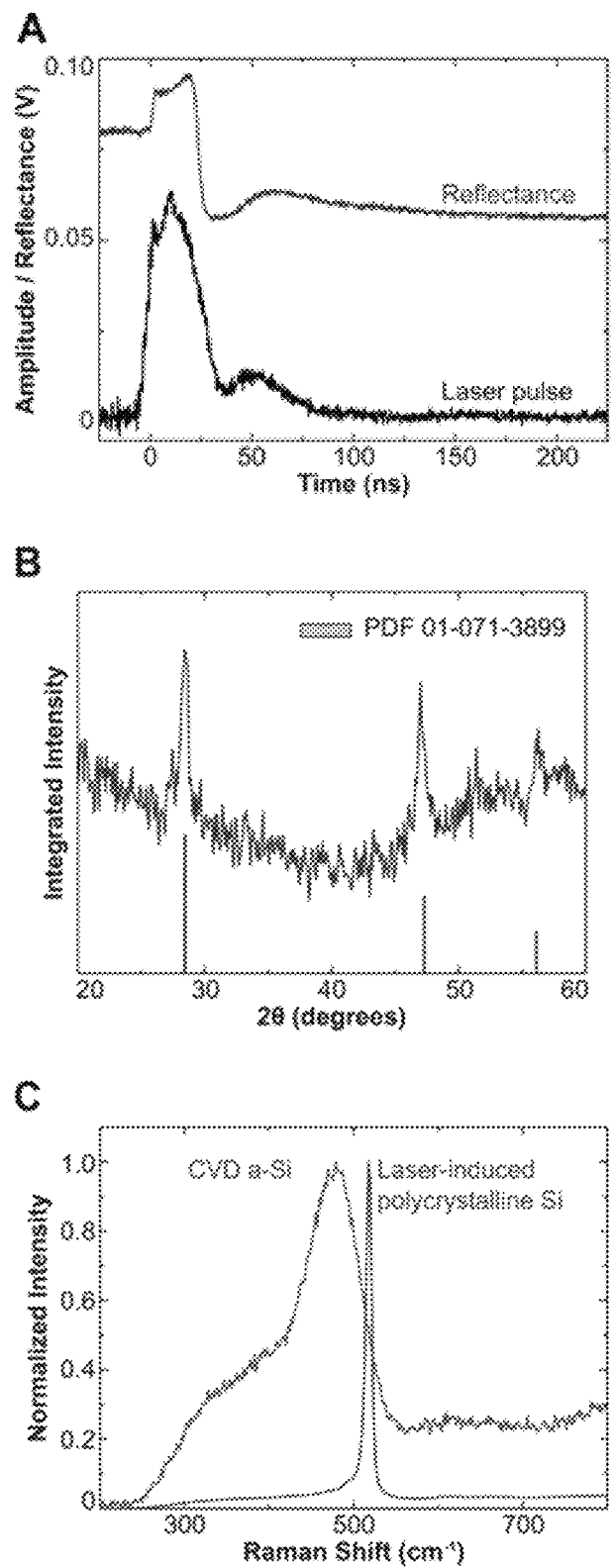
FIG. 12. Pulsed excimer laser-induced polycrystalline Si nanostructures. (A) Upper curve (Reflectance) shows time-resolved reflectance signal, using a 650 nm diode probe laser, of the 40-50 ns Si melt state and subsequent solidification induced via a pulsed excimer laser fluence of 550 $mJ/cm^2$. Lower curve (Laser Pulse) indicates incident excimer laser intensity profile. (B) Integrated intensity plot of the 2D X-ray diffraction pattern of excimer laser-induced BCP-directed polycrystalline Si nanostructures after template removal exhibiting the expected crystalline Si reflections (PDF 01-071-3899). (C) Raman spectra, using a 488 nm excitation laser source, of amorphous Si (a-Si) precursor in the laser-heated resin template (green curve), as well as after excimer laser-induced formation of polycrystalline Si nanostructures and template removal ("Laser-induced polycrystalline Si" curve). The peak shift from ~479 $cm^{-1}$ ("CVD a-Si" curve) to ~520 $cm^{-1}$ ("Laser-induced polycrystalline Si" curve) is consistent with melt-crystallization of a-Si to polycrystalline Si.
Figure 13:
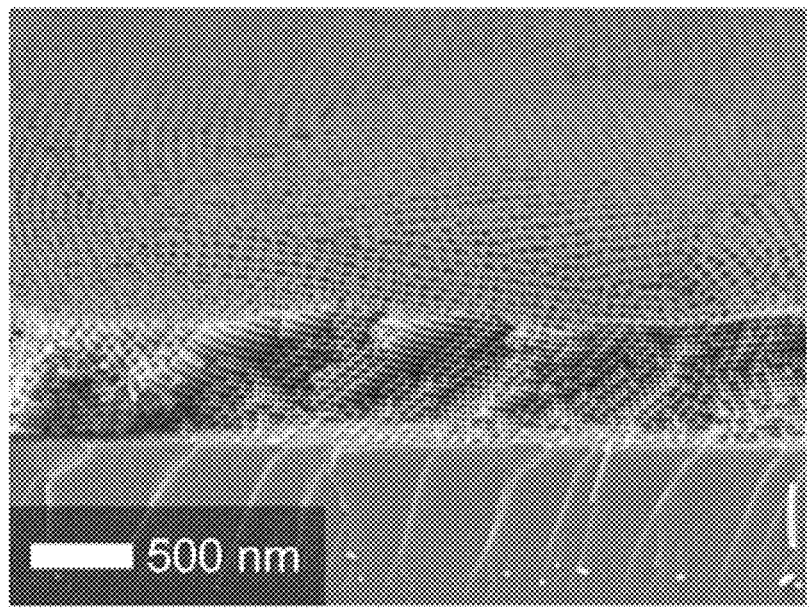
FIG. 13. SEM of mesoporous gyroidal resin structure. Cross-sectional SEM micrograph of periodically ordered mesoporous gyroidal resin template after pyrolysis under $N_2$ at lower magnification than shown in FIG. 4, K and L.

Finally, we demonstrated an all-laser-induced pattern transfer to create several-hundred-nanometer-thick 3D porous crystalline Si nanostructures using an excimer laser-induced Si melt-crystallization process described previously. To that end, B-WRITE-derived ISO-69-R structures were further heated for 1 hour at 400° C. under $N_2$ to enhance adhesion to the substrate. The resin pore network was then backfilled with amorphous Si (a-Si) by chemical vapor deposition (CVD) and irradiated with a single 40-ns pulsed XeCl excimer laser ($\lambda$=308 nm) at 550 $mJ/cm^2$ to induce a transient 40- to 50-ns Si melt, which subsequently solidified into polycrystalline Si (FIG. 12). SEM in FIG. 4, H to J, shows nanoporous polycrystalline Si nanostructures after template removal using $CF_4$ reactive ion and wet acid etching treatments. Use of an organic BCP-directed resin template, as opposed to BCP-directed inorganic templates, is not only stable for a-Si CVD at 350° C., but also survives the transient melt of a-Si at temperatures ~1250° C. enabling high pattern transfer fidelity. All-organic BCP-directed structures open pathways to templates with high degrees of periodic order obtained, e.g., via thermal or solvent annealing before porous structure formation. In a proof-of-concept experiment, SEM micrographs in FIG. 4, M and N, demonstrate that periodically ordered and networked mesoscopic crystalline Si nanostructures can be obtained after a-Si CVD into mesoporous gyroidal resin structures prepared by evaporation-induced self-assembly and pyrolysis (FIG. 4, K and L, and FIG. 13), excimer laser annealing and template removal. Plan view (FIG. 4, K and M) and cross-sectional (FIG. 4, L and N) SEM images suggest that the interconnected and periodic pores of the mesoporous gyroidal resin template were conformally backfilled by the network struts of the resulting laser-induced crystalline Si nanostructures. Furthermore, the mesoporous all-organic resin template is inert to hydrofluoric (HF) acid facilitating removal of native $SiO_2$ layers on the Si substrate using diluted HF (or HF vapor) before a-Si deposition and enabling formation of periodically ordered porous single-crystal epitaxial nanostructures.

Materials and Methods
Materials
Synthesis of poly(isoprene)-block-poly(styrene)-block-poly(ethylene oxide) (PI-b-PS-b-PEO, ISO) terpolymers by sequential anionic polymerization, resorcinol-formaldehyde and phenol-formaldehyde resols were performed as reported previously. The two ISO triblock terpolymers used in this study had molar masses of 38.3/68.9 kg/mol, polydispersity indices of 1.07/1.04, and compositions of 68.4/29.6 wt % PI, 18.0/64.8 wt % PS, and 13.6/5.6 wt % PEO (ISO-38/69). Oligomeric resols were synthesized by the polymerization of resorcinol/phenol and formaldehyde under basic conditions. Anhydrous tetrahydrofuran (THF), anhydrous dimethyl sulfoxide (DMSO) and Pluronic F127 copolymer (poly (ethylene oxide)-block-poly(propylene oxide)-block-poly (ethylene oxide), molar mass of 12.6 kg/mol) were obtained from Sigma Aldrich and used as received. Absolute ethanol (200 proof), sulfuric acid (97%) and hydrogen peroxide (30%) were obtained from Koptec, Fisher Chemical and Macron Fine Chemicals, respectively. Sylgard 184 silicone elastomer kit was obtained from Dow Corning. Tetramethylrhodamine (TRITC) dye was obtained from Invitrogen. 0.01-0.02 Ω·cm boron-doped silicon (Si) substrates were obtained from WRS Materials. The Si substrates were treated in piranha solution (sulfuric acid/hydrogen peroxide=3:1, v/v), rinsed profusely in deionized water and blown dry with $N_2$ before use.

Methods

ISO Terpolymer and Resols Thin Films.

The neat samples were prepared by spin-coating 5 wt % ISO-69 terpolymer and 5 wt % resorcinol-formaldehyde resols in THF, respectively, on Si substrates at 2000 rpm for 45 s in a $N_2$ drybox. The 5 wt % ISO-69 terpolymer thin films were dried in a vacuum oven at room temperature for at least 2 hours. The 5 wt % resols thin films were cured in a vacuum oven at 100° C. overnight (>12 hours).

BCP-Directed Resols Hybrid Thin Films.

ISO-directed resols hybrid thin films were prepared by mixing the ISO terpolymers with resorcinol-formaldehyde resols in THF for 1 hour prior to deposition on Si. F127-directed resols hybrid thin films were prepared by mixing Pluronics F127 copolymer with phenol-formaldehyde resols in ethanol for 2 hours prior to deposition on Si. See Table 1 for compositions and solution concentrations of the BCP-directed resols hybrid samples. The all-organic hybrid thin films were spin-coated on Si at 2000 rpm for 45 s in a $N_2$ drybox. Unless noted otherwise, the hybrid samples were cured in a vacuum oven at 100° C. overnight (>12 hours).

$CO_2$ Laser-Induced Transient Heating of BCP-Directed Resols Hybrid Samples.

The 10.6 μm $CO_2$ laser-induced transient heating setup and temperature calibration of Si substrate during laser irradiations are described previously. The laser was focused to a line with a beam profile full-width-half-maximum (FWHM) of approximately 90 μm by 600 μm. For transient heating, this line beam was scanned across the sample surface via dynamic sample stage movement at a velocity of 180 mm/s, resulting in 600 μm FWHM scan lines with a dwell time of 0.5 ms. Multiple overlapping passes were used to complete porous structure formation in the experiments. To heat larger areas (trench width >150 μm), the laser was scanned in a step and repeat fashion with a 55 μm step size. To avoid thermocapillary dewetting, the irradiation area at the highest temperature (40 W≈670° C.) was entirely contained within areas irradiated at the lower 10-35 W laser powers. For example, only the central 0.5 mm of a 0.7 mm wide area was heated to the highest temperature.

Transient Resols Thermopolymerization.

(1) All cured BCP-resols hybrid samples were irradiated with 20 overlapping passes of laser powers at 10, 20, 30 W, and 10 overlapping passes at 35 W, sequentially in a step and repeat fashion with a 55 μm step size; (2) The as-deposited ISO-38-R hybrid samples were irradiated with 20 overlapping passes of laser powers at 10, 20, 30 W, and 10 overlapping passes at 35 W, sequentially in a step and repeat fashion with a 55 μm step size; (3) The as-deposited ISO-69-R hybrid samples were irradiated with 40 overlapping passes of laser powers at 10, 20, 30 W, and 10 overlapping passes at 35 W, sequentially in a step and repeat fashion with a 55 μm step size.

Transient BCP Decomposition.

(1) For trenches with width <150 μm, the samples were irradiated with 10 overlapping passes at 40 W; (2) For larger scanned areas, the samples were irradiated with 5 overlapping passes at 40 W in a step and repeat fashion with a 55 μm step size.

Furnace Heat Treatment.

For calcination in air, the organic samples were slowly heated in a tube furnace at 1° C./min ramp rate to 150, 225, 300, 375 and 450° C., and held at the respective temperature for 1 hour. For pyrolysis under $N_2$, the organic samples were slowly heated in a tube furnace at 1° C./min ramp rate to 150, 300, 450 and 600° C., and held at the respective temperature for 1 hour to 3 hours at 600° C.).

Electrical Conductivity Measurements.

The 6 wt % ISO-69-R hybrid samples (ISO/resols=2.4:1, w/w) were spin-coated on Si with a thermally grown ~100-nm-thick $SiO_2$ overlayer. Laser-heated ISO-69-R nanoporous resin samples were formed by the B-WRITE method using as-deposited samples as described above, followed by rinsing with THF to remove non-irradiated ISO and resols components. For the 600° C. carbonization, the B-WRITE resin samples were heated in a tube furnace at 1° C./min ramp rate and held at 600° C. for 3 hours under $N_2$. For the 800° C. carbonization, the B-WRITE resin samples were first heated to 600° C. for 3 hours using a 1° C./min ramp rate, followed by raising the temperature to 800° C. for 1 hour using a 5° C./min ramp rate, all under $N_2$. Current/voltage (I/V) data were collected using a Cascade Microtech CPS-05 four-point probe station with a Keithley 2400 source meter. From optical microscopy and SEM, the dimensions of the rectangular-shaped B-WRITE nanoporous carbon samples heated at 600° C. (3 hours) under $N_2$ were w 610 μm in width and t≈98 nm in thickness. The dimensions of the rectangular-shaped B-WRITE nanoporous carbon samples heated at 800° C. (1 hour) under $N_2$ were w≈630 μm in width and t≈92 nm in thickness. The four point probe electrical conductivity of the B-WRITE carbon samples was calculated using $\sigma=(I/V)\cdot[s/(w\times t)]$, where w is the line width and s is the inter-probe spacing (1 mm). Dense resols derived carbon films were prepared by spin-coating resorcinol-formaldehyde resols solution on the $SiO_2$/Si substrates and cured in a vacuum oven at 100° C. overnight (>12 hours), followed by carbonization at 800° C. for 1 hour under $N_2$ as described above. The four point probe electrical conductivity for the dense carbon film was calculated using $\sigma=(1/4.532)\cdot(I/V)\cdot(1/t)$, where t is the thickness determined to be approximately 158 nm.

Microfluidic Device Fabrication by $CO_2$ Laser Writing.

The microfluidic device fabrication is schematically illustrated in FIG. 11a. A dense resols film was formed by spin-coating the 20 wt % resorcinol-formaldehyde resols solution on Si at 2000 rpm for 60 s and curing in a vacuum oven at 100° C. overnight (>12 hours). The trench was formed with a single $CO_2$ laser irradiation at 30 W of 25 ms dwell (175 μm step size). A 6 wt % ISO-38-R hybrid solution (ISO/resols=3:1, w/w) was spin-coated and cured in a vacuum oven at 100° C. overnight (>12 hours). The laser-heated ISO-38-R nanoporous resin structures were formed in the trench by the B-WRITE method as described above.

A (3-aminopropyl)-trimethoxysilane (APTMS) layer was coated on the sample by vapor deposition using an Applied MicroStructures MVD100 tool and heated in an oven at 80° C. for at least 1 hour. A ~2-mm-thick PDMS film was prepared by mixing the Sylgard 184 monomer and curing agent in a 10:1 mass ratio in a petri dish, degassing in a vacuum desiccator, and curing at 60° C. for 4 hours. Holes were punched in the PDMS film for the inlet and outlet ports. Finally, the APTMS surface-functionalized sample and PDMS film were exposed to ambient air plasma for 30-40 s (50 W, Harrick Plasma) and placed in conformal contact at room temperature for >1 hour. The microfluidic flow experiments were conducted on the CorSolutions microfluidic probe station with a PV-1500 packing vessel pump delivering a pulse-free flow of 2.82 mM TRITC dye dissolved in DMSO through the channel with 10-20 psi dry $N_2$.

Hierarchical structure formation coupling photolithography, BCP-directed resols self-assembly, and $CO_2$ laser-induced transient heating. Photolithography was used to pattern Shipley 1813 photoresist as a mask for the Si etch. The exposed Si surface was etched by $SF_6$ in a reactive ion etcher (RIE) for 140 s (30 sccm, 200 mTorr, 200 W) to form trenches using an Oxford PlasmaLab 80+ RIE System. After etch, the photoresist was stripped in an oxygen plasma using a Gasonics Aura 1000 tool. The 6 wt % ISO-69-R hybrid system (ISO/resols=2.4:1, w/w) was spin-coated on the patterned Si substrates and cured in a vacuum oven at 100° C. overnight (>12 hours). The laser-heated ISO-69-R nanoporous resin structures were formed in the Si trenches by the B-WRITE method as described above.

All-Laser-Induced Crystalline Si Nanostructure Fabrication.

Nanoporous resin samples were formed by the B-WRITE method using as-deposited 6 wt % ISO-69-R hybrid samples on Si as described above, followed by rinsing with THF to remove the non-irradiated components. The B-WRITE porous resin structures were further heated in a tube furnace under $N_2$ at 400° C. for 1 hour to improve adhesion to the Si substrate. Amorphous Si was deposited into the porous resin template by static chemical vapour deposition using disilane at 350° C. for 3 hours. A single 40 ns pulsed XeCl excimer laser irradiation ($\lambda$=308 nm) at 550 mJ/cm$^2$ was used to melt the amorphous Si precursor in a small vacuum chamber (<1 Torr) with a quartz window. The excimer laser-irradiated sample was then exposed to $CF_4$ for 15 s (30 sccm, 40 mTorr, 150 W) to remove the Si overlayer using an Oxford PlasmaLab 80+ RIE System, hot piranha solution for 3 hours (sulfuric acid/hydrogen peroxide=3:1, v/v, 75° C.) to remove the template, and 49% hydrofluoric acid for 10-20 s to remove the chemical $SiO_2$ layer.

Laser-Induced Periodic Crystalline Si Nanostructure Fabrication.

Periodically ordered alternating gyroidal resin templates were prepared by evaporation-induced self-assembly (ISO-69/resols=3.125:1, w/w), thermal curing at 125° C. in an oven overnight (>12 hours), followed by pyrolysis under $N_2$ at 450° C. for 1 hour (1° C./min ramp rate). Amorphous Si backfilling of the gyroidal resin template, pulsed excimer laser irradiation of the amorphous Si precursor, as well as resin template removal were carried out as described above.

Characterization

SEM images of Au-Pd coated organic thin films and uncoated carbonized samples were acquired using a LEO 1550 SEM equipped with an in-lens detector. Fast Fourier transform (FFT) analysis was performed on plan view SEM micrographs in the ImageJ software using a Radial Profile Extended plugin script. Profilometry measurements were conducted using a Tencor P-10 profilometer and smoothed with a FFT filter operation in the GenPlot software. Film thickness (mean±SD) of neat BCP, resols, BCP-resols hybrid thin films and porous resin structures were measured using SEM images (taking from N=6 to N=40 cross-section measurements) and/or a profilometer (number of measurements, N≥3). Fourier transform infrared (FTIR) spectroscopy measurements were acquired using a Bruker Hyperion FTIR microscope in attenuated total reflectance and specular reflectance modes. Baseline subtraction was performed on the FTIR spectra using a smoothing spline fitting operation in the OriginPro 9 software. Raman spectroscopy measurements were conducted using a Renishaw InVia confocal Raman microscope with 488 nm and 785 nm excitation laser sources. Peak fitting was performed on the Raman spectra in the OriginPro 9 software. Optical microscopy images were acquired using an Olympus BX51 microscope (upright fluorescence microscope) equipped with a mercury lamp source and a Chroma 41002B (605/75) fluorescence filter. 2D X-ray diffraction measurements were conducted on a Bruker General Area Detector Diffraction System (GADDS) equipped with a Bruker HI-STAR area detector using Cu $K_\alpha$ radiation. Thermogravimetric analysis (TGA) was conducted using a Seiko Exstar TG/DTA 6200 thermal analyzer at a heating rate of 5° C./min under helium.

TABLE 1

Compositions and solution concentrations of the BCP-directed resols hybrid samples.

| organic film | BCP/resols mass ratio | solution concentration (solvent) | film thickness (nm) |
| --- | --- | --- | --- |
| ISO-38-R | 3:1 | 6 wt % (tetrahydrofuran) | 503 ± 7 |
| ISO-38-R | 3:1 | 10 wt % (tetrahydrofuran) | 1063 ± 8 |
| ISO-38-R | 3:1 | 12.5 wt % (tetrahydrofuran) | 1610 ± 39 |
| ISO-38-R | 1.5:1 | 6 wt % (tetrahydrofuran) | 569 ± 3 |
| ISO-69-R | 2.4:1 | 6 wt % (tetrahydrofuran) | 620 ± 15 |
| ISO-69-R | 1.5:1 | 6 wt % (tetrahydrofuran) | 656 ± 5 |
| F127-R | 1:1 | 20 wt % (ethanol) | 890 ± 8 |
| F127-R | 1:2 | 20 wt % (ethanol) | 665 ± 16 |
| ISO-38 | | 5 wt % (tetrahydrofuran) | 450 ± 10 |
| ISO-69 | | 5 wt % (tetrahydrofuran) | 471 ± 5 |
| resorcinol-formaldehyde resols | | 5 wt % (tetrahydrofuran) | 143 ± 5 |
| resorcinol-formaldehyde resols | | 20 wt % (tetrahydrofuran) | 944 ± 3 |

Although the present disclosure has been described with respect to one or more particular embodiments and/or examples, it will be understood that other embodiments and/or examples of the present disclosure may be made without departing from the scope of the present disclosure.

What is claimed is:

1. A method of making a hierarchically porous structure comprising:
   a) forming a layer comprising a first polymeric material and a second polymeric material on at least a portion of a surface of a substrate, wherein the first polymeric material self assembles providing structured domains, and
   b) exposing at least a portion of the layer in air to electromagnetic radiation, wherein the first polymeric material, if present, and the second polymeric material are organic materials after the exposing, wherein at least a portion of the first polymeric material in the portion of the layer exposed to the electromagnetic radiation decomposes forming the hierarchically porous structure.

2. The method of claim 1, further comprising repeating b) a desired number of times.

3. The method of claim 2, wherein the repeating b) is carried out by rastering a laser beam across the layer.

4. The method of claim 1, wherein the electromagnetic radiation is provided by a laser.

5. The method of claim 4, wherein the laser is a carbon dioxide ($CO_2$) laser.

6. The method of claim 1, wherein the first polymeric material self assembles in step a) providing hierarchical structured domains.

7. The method of claim 1, wherein pores having a pore size from 10 nm to 600 nm are formed.

8. The method of claim 1, wherein the electromagnetic radiation induces selective thermal degradation of the first polymeric material.

9. The method of claim 1, wherein only a portion of the layer is exposed to the electromagnetic radiation and the unexposed portion(s) of the layer are removed by contacting the layer with a solvent.

10. The method of claim 1, wherein the second polymeric material is thermally polymerized.

11. The method of claim 1, wherein the second polymeric material is a negative tone material.

12. The method of claim 1, further comprising thermal treatment of the hierarchically porous structure to form a carbonized hierarchically porous structure.

13. The method of claim 1, wherein the electromagnetic radiation does not carbonize the first polymeric material.

14. The method of claim 1, the method further comprising using the layer as a template to form a layer comprising a silicon material.

15. The method of claim 1, wherein the electromagnetic radiation does not carbonize the second polymeric material.

16. The method of claim 1, wherein the electromagnetic radiation does not carbonize the first polymeric material or the second polymeric material.

17. The method of claim 1, wherein the substrate is heated by the exposing.

18. A method of making a hierarchically porous structure comprising:
   a) forming a layer comprising a first polymeric material and a second polymeric material on at least a portion of a surface of a substrate, wherein the first polymeric material self assembles providing structured domains, and
   b) exposing at least a portion of the layer in air to electromagnetic radiation, wherein the substrate is heated, and the first polymeric material, if present, and the second polymeric material are organic materials after the exposing, wherein at least a portion of the first polymeric material in the portion of the layer exposed to the electromagnetic radiation decomposes forming the hierarchically porous structure.

* * * * *